US012279035B2

(12) United States Patent
Taguchi et al.

(10) Patent No.: US 12,279,035 B2
(45) Date of Patent: Apr. 15, 2025

(54) INSPECTION DEVICE, BLISTER PACKAGING MACHINE, AND METHOD FOR MANUFACTURING BLISTER PACK

(71) Applicant: CKD CORPORATION, Aichi (JP)

(72) Inventors: Yukihiro Taguchi, Aichi (JP); Shozo Oda, Aichi (JP)

(73) Assignee: CKD CORPORATION, Aichi (JP)

( * ) Notice: Subject to any disclaimer, the term of this patent is extended or adjusted under 35 U.S.C. 154(b) by 61 days.

(21) Appl. No.: 18/377,258

(22) Filed: Oct. 5, 2023

(65) Prior Publication Data

US 2024/0040230 A1 Feb. 1, 2024

Related U.S. Application Data

(63) Continuation of application No. PCT/JP2021/043103, filed on Nov. 25, 2021.

(30) Foreign Application Priority Data

Apr. 7, 2021 (JP) ................................. 2021-065178

(51) Int. Cl.
*G01J 5/08* (2022.01)
*B65B 7/28* (2006.01)
(Continued)

(52) U.S. Cl.
CPC ............... *H04N 23/58* (2023.01); *B65B 7/28* (2013.01); *B65B 11/52* (2013.01); *B65B 43/08* (2013.01);
(Continued)

(58) Field of Classification Search
CPC ............ G01N 21/9508; G01N 21/892; G01N 21/8914; G01N 21/95; H04N 23/61;
(Continued)

(56) References Cited

U.S. PATENT DOCUMENTS

2007/0296963 A1* 12/2007 Parker ................ G01N 21/9508
356/240.1
2013/0015354 A1* 1/2013 Diamond ........... G01N 21/4795
250/222.1

FOREIGN PATENT DOCUMENTS

| JP | H07-146254 A | 6/1995 |
| JP | H11-187321 A | 7/1999 |
| JP | 2007-147433 A | 6/2007 |

OTHER PUBLICATIONS

International Preliminary Report on Patentability issued in International Application No. PCT/JP2021/043103; mailed Oct. 19, 2023 (12 pages).

(Continued)

*Primary Examiner* — Howard D Brown, Jr.
(74) *Attorney, Agent, or Firm* — Osha Bergman Watanabe & Burton LLP

(57) ABSTRACT

An inspection device includes: an illumination device; an imaging device that includes: an optical system that corrects a field curvature; an imaging element that takes an image via the optical system; and a mirror that reflects an incident light from the inspection object toward the optical system; and an inspection controller that: judges whether a quality of the inspection object is good or poor based on image data; and controls the imaging device to take an image of a first inspection area at a first timing when the first inspection area is located within a first focusing range, in which the first inspection area is focusable without the mirror, and to take an image of a second inspection area at a second timing when the second inspection area is located within a second focusing range, in which the second inspection area is focusable via the mirror.

18 Claims, 12 Drawing Sheets

(51) Int. Cl.
  *B65B 11/52* (2006.01)
  *B65B 43/08* (2006.01)
  *B65B 57/00* (2006.01)
  *B65B 61/04* (2006.01)
  *G01N 21/95* (2006.01)
  *G06T 7/00* (2017.01)
  *H04N 23/58* (2023.01)
  *G02B 27/00* (2006.01)

(52) U.S. Cl.
  CPC .............. *B65B 57/00* (2013.01); *B65B 61/04* (2013.01); *G06T 7/0004* (2013.01); *B65B 2230/02* (2013.01); *G02B 27/0025* (2013.01); *G06T 2207/30108* (2013.01)

(58) Field of Classification Search
  CPC ........ H04N 23/67; H04N 23/55; H04N 23/74; H04N 23/58; B65B 7/28; B65B 11/52; B65B 43/08; B65B 57/00; B65B 61/04; B65B 2230/02; B65B 9/045; B65B 41/16; B65B 47/02; B65B 47/04; B65B 57/06; B65B 61/065; B65B 61/28; G06T 7/0004; G06T 2207/30108; G02B 27/0025; G02B 21/0012

See application file for complete search history.

(56) References Cited

OTHER PUBLICATIONS

International Search Report issued in corresponding International Application No. PCT/JP2021/043103 mailed Feb. 8, 2022 (5 pages).
Written Opinion issued in corresponding International Application No. PCT/JP2021/043103 mailed Feb. 8, 2022 (4 pages).

* cited by examiner

INSPECTION DEVICE, BLISTER PACKAGING MACHINE, AND METHOD FOR MANUFACTURING BLISTER PACK

BACKGROUND

Technical Field

The present disclosure relates to an inspection device configured to perform an inspection for packaging containers, such as blister packs, a blister packaging machine and a method for manufacturing the blister pack.

Description of Related Art

Blister packs have widely been used as packing containers to package, for example, medicinal products, food stuff, and electronic components. An especially known blister pack in the field of medicinal products is a PTP (press through package) sheet used to package tablets, capsules or the like.

The PTP sheet includes a container film with a pocket portion formed therein to be filled with a content such as a tablet; and a cover film mounted to the container film such as to seal an opening side of the pocket portion. The content is taken out by pressing the pocket portion from outside and causing the content placed in the pocket portion to break the cover film serving as a cover.

This PTP sheet is manufactured through, for example, a pocket portion forming process of forming a pocket portion in a belt-shaped container film, a filling process of filling a content into the pocket portion; a mounting process of mounting a cover film to the container film such as to seal an opening side of the pocket portion, and a separation process of separating a PTP sheet as a final product from a belt-shaped PTP film obtained by mounting the respective belt-shaped films to each other.

A general procedure of forming the pocket portions stretches some part of a partly heated and softened a belt-shaped container film by for example, vacuum forming, pressure forming, plug forming or plug assist pressure forming. In this pocket portion forming process, there is a possibility that various formation failures defects occur in not only the pocket portions but flange portions around the pocket portions and the like.

The container film is likely to have a formation defect or failure, such as a scar-like deformation of the container film or formation of wrinkles or holes in the container film by, for example, excessive contact of the container film with a heater. Another possible formation defect or failure is excessive thickening or thinning of the pocket portion or the flange portion. As a result, such a formation defect or failure decreases the external appearance quality and is also likely to cause various troubles, such as reduction of the gas barrier properties.

As a countermeasure, for example, an inspection device has been proposed to perform an inspection for the external appearance of tablets along with a sheet portion of a blister sheet, based on one inspection grayscale image obtained by taking images of the tablets filled in pocket portions of the blister sheet (as described in, for example, PTL 1).

PATENT LITERATURE

PTL 1: Japanese Patent No. H11-1187321A
PTL 2: Japanese Patent No. H07-146254A
PTL 3: Japanese Patent No. 2007-147433A A configuration described in PTL 1 or more specifically a configuration of using only one camera for imaging both an area of a sheet portion of a blister sheet and a surface of tablets that is a higher area than the area of the sheet portion by the thickness of the tablets enables focused imaging to be performed with regard to both the tablets and the sheet portion, as long as a height difference between a plurality of areas in an inspection object is within a focusing range (depth of field) of one camera.

In order to make a plurality of inspection areas having different heights in an inspection object fall within the focusing range, however, there is a need to sufficiently reduce the aperture (for example, by using a pinhole camera or anything like that), except the case of a sufficiently small height difference. Accordingly, this requires a long exposure time.

In a production process of the blister sheet or the like, on the other hand, an inspection of an inspection object, such as a container film, needs to complete imaging in a short time period during conveyance of the inspection object. It is thus extremely difficult to ensure a long exposure time.

One recently proposed configuration uses a half mirror or the like to separate light from a plurality of inspection areas having different heights in an inspection object, forms images of the separated lights via different lenses, and thereby enables a focused inspection image to be obtained with regard to the plurality of inspection areas having different heights by using only one camera (as described in, for example, PTL 2). Another recently proposed configuration makes adjustment to equalize optical path lengths from each of inspection areas in an inspection object to a camera with regard to all the inspection areas by using a plurality of mirrors in combination, and thereby enables a focused inspection image to be obtained with regard to the plurality of inspection areas having different heights by using only one camera (as described in, for example, PTL 3).

The prior art configuration as described in PTL 2 or PTL 3, however, has a complicated structure of the optical system and requires exclusive design for each inspection object. This prior art configuration is thus likely to have low versatility and to become expensive.

The above issues may arise not only in the field of PTP packaging used for packaging tablets or the like but in the field of other blister packaging used for packaging a predetermined content.

SUMMARY

By taking into account the circumstances described above, one or more embodiments of the present disclosure provide an inspection device configured to enhance an inspection accuracy and simplify a device configuration, a blister packaging machine and a method for manufacturing a blister pack.

The following describes each of various aspects of the present disclosure. Functions and advantageous effects that are characteristic of each of the aspects are also described as appropriate.

Aspect 1. There is provided an inspection device comprising: an irradiation unit (i.e., an illumination device) configured to irradiate a conveyed object to be inspected or a conveyed inspection object with predetermined light; an imaging unit (i.e., an imaging device) including a predetermined optical system configured to correct a field curvature in the optical system, an imaging element configured to take an image of the inspection object via the optical system to obtain image data, and a mirror configured to reflect an incident light entering from the inspection object, toward the optical system; an imaging control unit (i.e., an inspection controller) configured to control the imaging unit; and a good/poor quality judgment unit (i.e., the inspection controller) configured to judge whether a quality judgment of the inspection object is good or poor, based on the image data obtained by the imaging unit. The imaging control unit controls the imaging unit by executing: a first imaging process of causing the imaging unit to take an image of a first inspection area (for example, a flange portion of a container) of the inspection object at a first timing when the first inspection area is located within a first focusing range of the imaging unit, wherein the first inspection area is focusable within the first focusing range without the mirror; and a second imaging process of causing the imaging unit to take an image of a second inspection area (for example, a bottom portion of the container) of the inspection object at a second timing when the second inspection area is located within a second focusing range of the imaging unit, wherein the second inspection area is out of the first focusing range in the first imaging process and is focusable within the second focusing range via the mirror.

The "conveyance" described above includes continuous conveyance of continuously conveying the inspection object and intermittent conveyance of intermittently conveying the inspection object.

The "predetermined light" described above includes not only visible light but ultraviolet light and infrared light.

The "field curvature" described above denotes an optical aberration that causes a focusing surface parallel to an optical system not to become a flat plane on a front side of the optical system relative to a flat plane on a rear side of the optical system.

The "predetermined optical system" described above includes, for example, an optical system comprised of one optical member (for example, a single lens) and an optical system comprised of a plurality of optical members (for example, a lens group unit).

The "incident light entering from the inspection object" described above includes reflected light that is reflected from the inspection object and transmitted light that is transmitted through the inspection object.

The "mirror" described above is placed at a position that intersects with at least an optical path passing through in a range of an angle of view of the optical system and at a position that does not intersect with an optical axis of the optical system (a center line in the angle of view).

The imaging unit according to above Aspect 1 includes the predetermined optical system configured to correct the field curvature and the mirror configured to reflect the incident light entering from the inspection object, toward the optical system.

Providing the predetermined optical system configured to correct the field curvature causes the focusing surface on the object side to become a flat plane relative to a flat plane of the imaging element on the imaging side. In a configuration with omission of the mirror described above, a distance (optical path length) from the imaging unit to a height position of a midportion in a focusing range of the imaging unit is a distance L0 (shown in FIG. 7) at a center position in the field of vision of the imaging unit (at a position of an optical axis of the optical system) but is a distance L1, which is longer than the distance L0, at an end in the field of vision of the imaging unit.

In this configuration, the mirror described above is provided such that an optical path of the incident light entering from the inspection object is refracted via the mirror. This configuration enables the second focusing range that is brought into focus via the mirror to be set at least at a height position (a position in a direction of an optical axis of the imaging unit) different from the height position of the first focusing range that is brought into focus without the mirror (at a lower position than the first focusing range or at a higher position than the first focusing range)

The imaging unit is controlled to take an image of the first inspection area (for example, the flange portion of the container) of the inspection object that is brought into focus even by direct imaging without the mirror, at a first timing when the first inspection area is located within the first focusing range (first imaging process).

The imaging unit is, on the other hand, controlled to take an image of the second inspection area (for example, the bottom portion of the container) of the inspection object that is brought into focus via the mirror (that is not brought into focus by direct imaging without the mirror), at a second timing when the second inspection area is located within the second focusing range (second imaging process).

The good/poor quality judgment unit then performs the good/poor quality judgment with regard to the inspection object (the first inspection area and the second inspection area), based on a first inspection image obtained by the first imaging process and a second inspection image obtained by the second imaging process.

As a result, the configuration of this aspect enables focused image data to be obtained with regard to each of a plurality of inspection areas having different heights in the inspection object by using only one imaging unit and using only one mirror without requiring multiple mirrors, and enhances the inspection accuracy.

This accordingly simplifies the configuration of the inspection device and the focusing operation of the inspection device, and also enables the inspection device to be manufactured inexpensively and enhances the versatility of the inspection device.

Aspect 2. In the inspection device described in above Aspect 1, the second timing may be a timing when the second inspection area of the inspection object is located at an identical position with a position of the mirror in a conveyance direction of the inspection object (for example, at a position immediately below the mirror with regard to the inspection object that is conveyed horizontally).

The configuration of above Aspect 2 maximizes a height difference between the second focusing range that is brought into focus via the mirror and the first focusing range that is brought into focus without the mirror, at the identical position with the position of the mirror in the conveyance direction of the inspection object. As a result, this configuration allows for an inspection for an inspection object having a larger height difference and thereby enhances the versatility.

Aspect 3. In the inspection device described in either above Aspect 1 or above Aspect 2, the mirror may reflect, at the second timing, an incident light toward the optical system, wherein the incident light passes through an optical path parallel to a normal direction of the second inspection area (a surface to be imaged) of the inspection object and enters the mirror from the second inspection area.

The configuration of above Aspect 3 enables an image of the second inspection area (the surface to be imaged) to be taken from a front side. This enhances the inspection accuracy.

The inspection device described in any of above Aspects 1 to 3 may further comprise a mirror adjustment unit (i.e., a mirror adjustment device) configured to adjust at least one of a direction and a position (a height position or the like) of the mirror.

The configuration of above Aspect 4 allows for a change in the height position of the second focusing range or a change in the second inspection area that is the inspection object (for example, a change from a bottom portion to a side wall portion of a container) by adjusting the direction and the position of the mirror. As a result, this configuration allows for an inspection for any of a variety of inspection objects having different shapes or different sizes or for any of a variety of inspection purposes. This configuration accordingly enhances the versatility.

Aspect 5. In the inspection device described in any one of above Aspects 1 to 4, the imaging unit may be provided with a second mirror configured to reflect an incident light entering from the inspection object, toward the optical system, and the imaging control unit may be configured to further execute a third imaging process of causing the imaging unit to take an image of a third inspection area (for example, the side wall portion of the container) of the inspection object at a third timing when the third inspection area is located within a third focusing range of the imaging unit, wherein the third inspection area is focusable within the third focusing range via the second mirror.

The configuration of above Aspect 5 facilitates an inspection for any of a variety of inspection objects, for example, an inspection object having a larger height difference or an inspection object having a more complicated shape. This accordingly enhances the versatility.

Aspect 6. There is provided a blister packaging machine, comprising the inspection device described in any one of above Aspects 1 to 5.

Providing the inspection device described above in the blister packaging machine (for example, a PTP packaging machine) like the configuration of above Aspect 6 has an advantage of, for example, efficiently removing defective products in a manufacturing process of blister packs (for example, PTP sheets). The blister packaging machine may be provided with a discharge unit configured to discharge a blister pack determined as a defective product by the inspection device.

The above "blister pack" includes, for example, a PTP sheet with tablets or the like placed therein, a portion pack with food stuff or the like placed therein, and a carrier tape with an electromagnetic component or the like placed therein.

A more concrete configuration of the blister packaging machine is, for example, a configuration described below.

"There is provided a blister packaging machine configured to manufacture a blister pack, which has a predetermined content that is placed in a pocket portion formed in a container film as the inspection object and has a cover film that is mounted to close the pocket portion. The blister packaging machine comprises a conveyance unit configured to convey the container film; a pocket portion forming unit configured to form the pocket portion in the conveyed belt-shaped container film; a filling unit configured to fill the content into the pocket portion; a mounting unit configured to mount the belt-shaped cover film to the container film with the pocket portion filled with the content, such as to close the pocket portion; a separation unit (including a punching unit configured to punch out in a sheet unit) configured to separate the blister pack from a belt-shaped body (a belt-shaped blister film) obtained by mounting the cover film to the container film; and the inspection device described in any one of above Aspects 1 to 5."

An inspection of a container film of unstable posture requires a process of specifying the position of each pocket portion and, in the case of a non-circular pocket portion, additionally needs a process of calculating the center position of the pocket portion as an inspection object from image data, a process of adjusting the center of a reference image for pattern matching stored in advance to the calculated center position of the pocket portion, a process of rotating the reference image by every predetermined angle, and a process of determining whether the center of the reference image is placed at the calculated center position every time the reference image is rotated. The inspection with regard to the pocket portion accordingly requires a significantly large number of processes and is time- and labor-consuming.

Providing the inspection device on the blister packaging machine like the configuration of above Aspect 6, on the other hand, fixes the position, the posture and the direction of the container film relative to the imaging unit. This configuration does not require position adjustment or direction adjustment of an inspection object in the course of an inspection and thereby increases the speed of the inspection. As a result, this configuration remarkably reduces the required number of processes with respect to each pocket portion and thereby significantly increases the speed of the inspection process.

Furthermore, in the configuration of above Aspect 6, "the filling unit may be placed on a downstream side of the inspection device." The blister packaging machine "may further comprise a filling control unit configured to control an operation of the filling unit based on a result of the inspection by the inspection device and to switch over between filling and non-filling of the content into the pocket portion."

This configuration allows the content not to be filled in, for example, a pocket portion having a formation defect. In the case of disposal of a blister pack due to the formation defect of the pocket portion, this configuration prevents the occurrence of a trouble that the content is wasted accompanied with the disposal of the blister pack. This configuration also does not require a troublesome operation of taking out the content once filled in the pocket portion for recycle of the content. As a result, this suppresses reduction of the productivity.

Aspect 7. There is provided a method for manufacturing a blister pack, which has a predetermined content that is placed in a pocket portion formed in a container film and has a cover film that is mounted to close the pocket portion. The method for manufacturing the blister pack comprises a pocket portion forming process of forming the pocket portion in a conveyed belt-shaped container film; a filling process of filling the content into the pocket portion; a mounting process of mounting a belt-shaped cover film to the container film with the pocket portion filled with the content to close the pocket portion and obtaining a belt-shaped body (a belt-shaped blister film); a separation process (including a punching process of punching out in a sheet unit) of separating the blister pack from the belt-shaped body obtained by mounting the cover film to the container film; and an inspection process of inspecting the container film with the pocket portion formed therein, as an object to be inspected or an inspection object. The inspection process comprises: an irradiation process of irradiating the container film with the pocket portion formed therein, with predetermined light; and a good/poor quality judgment process of judging whether a quality of the container film is good or poor, based on image data obtained by an imaging device that takes an image of the container film irradiated with the light. The imaging unit comprises an optical system that correct a field curvature in the optical system, and a mirror that reflects an incident light entering from the container film, toward the optical system. The inspecting further comprises controlling the imaging unit by executing: a first imaging process of causing the imaging unit to take an image of a first inspection area (for example, a flange portion) of the container film at a first timing when the first inspection area is located within a first focusing range of the imaging unit, wherein the first inspection area is focusable within the first focusing range without the mirror; and a second imaging process of causing the imaging unit to take an image of a second inspection area (for example, a bottom portion of the pocket portion) of the container film at a second timing when the second inspection area is located within a second focusing range of the imaging unit, wherein the second inspection area is out of the first focusing range in the first imaging process and is focusable within the second inspection area via the mirror.

The configuration of above Aspect 7 has similar functions and advantageous effects to those of Aspect 1 and Aspect 6 described above.

DETAILED DESCRIPTION OF EMBODIMENTS

The following describes embodiments with reference to drawings. A PTP sheet 1 as a blister pack is described first.

Figure 1:
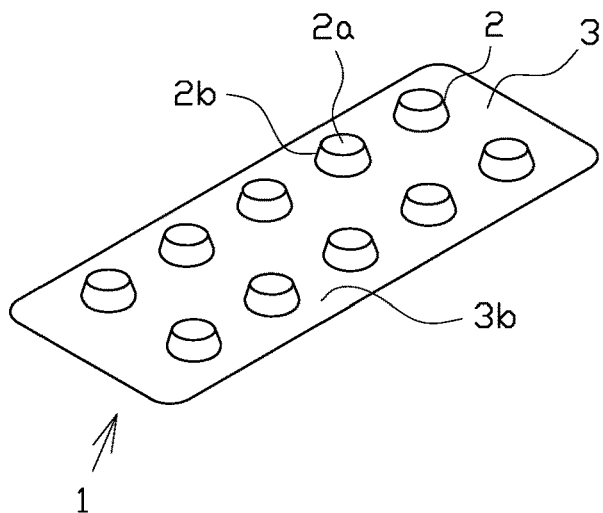
FIG. 1 is a perspective view illustrating a PTP sheet.
Figure 2:
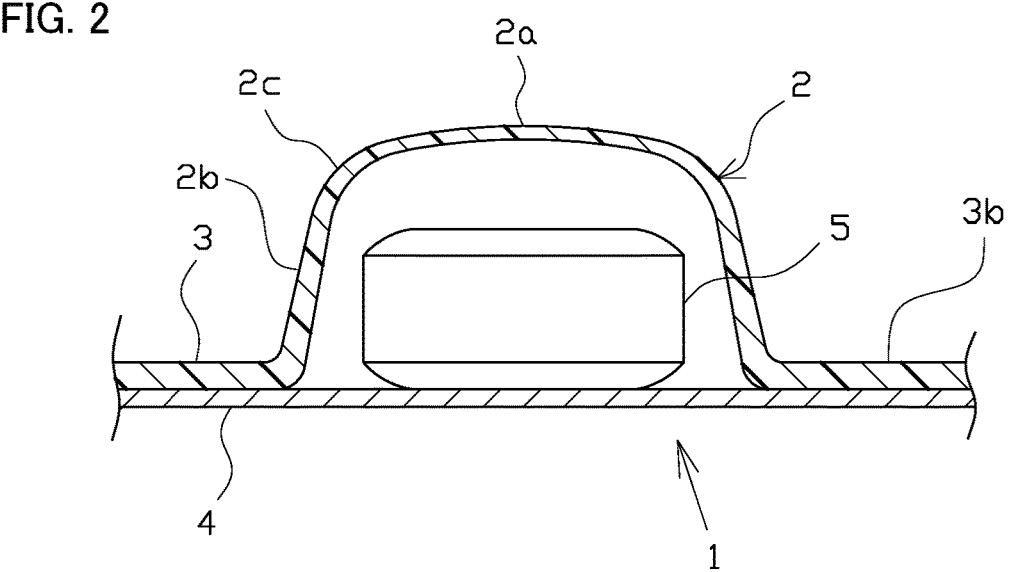
FIG. 2 is a partially enlarged sectional view illustrating the PTP sheet.

As shown in FIG. 1 and FIG. 2, the PTP sheet 1 includes a container film 3 provided with a plurality of pocket portions 2, and a cover film 4 mounted to the container film 3 such as to close the respective pocket portions 2.

The container film 3 is made of a colorless transparent thermoplastic resin material, such as PP (polypropylene) or PVC (polyvinyl chloride), and has translucency. The cover film 4 is, on the other hand, made of an opaque material (for example, aluminum foil) with a sealant that is made of, for example, a polypropylene resin and that is provided on a surface thereof.

The PTP sheet 1 is formed in an approximately rectangular shape in plan view. The PTP sheet 1 has two pocket portion arrays formed in a sheet short side direction, and each pocket portion array includes five pocket portions 2 arranged along a sheet longitudinal direction. Accordingly, a total of ten pocket portions 2 are formed in the PTP sheet 1. One tablet 5 as a content is placed in each of the pocket portions 2.

The pocket portion 2 includes a bottom portion 2a formed in an approximately circular shape in plan view and arranged to be opposed to the cover film 4, and a side wall portion 2b formed in an approximately cylindrical shape to be connected with the periphery of the bottom portion 2a and to connect the bottom portion 2a with a flange portion 3b. The flange portion 3b according to the embodiment denotes a substantially flat region (pocket portion non-forming area) where the pocket portions 2 are not formed and where the cover film 4 is mounted to.

The bottom portion 2a according to the embodiment is formed to be gently curved and to have an approximately arc-shaped cross section. This configuration is, however, not essential. The bottom portion 2a may be formed flat. In another example, the bottom portion 2a may be formed to have an arc-shaped cross section of the larger curvature with an ambiguous and unclear corner portion 2c where the bottom portion 2a and the side wall portion 2b intersect.

Figure 3:
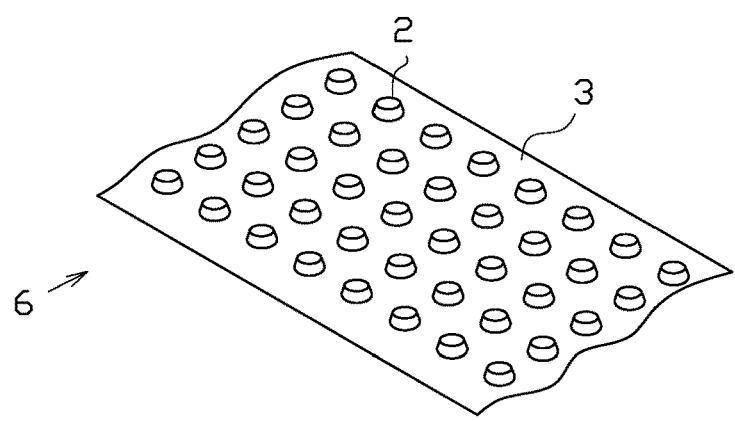
FIG. 3 is a perspective view illustrating a PTP film.

The PTP sheet 1 (shown in FIG. 1) is manufactured by punching out a rectangular sheet form from a belt-shaped PTP film 6 (shown in FIG. 3) comprised of a belt-shaped container film 3 and a belt-shaped cover film 4. The container film 3 configures the inspection object according to the embodiment.

The following describes the schematic configuration of a PTP packaging machine 11 as a blister packaging machine configured to manufacture the PTP sheet 1 described above, with reference to FIG. 4.

A film roll of the belt-shaped container film 3 is wound in a roll form on a most upstream side of the PTP packaging machine 11. A pullout end of the container film 3 wound in the roll form is guided by a guide roll 13. The container film 3 is then laid on an intermittent feed roll 14 provided on a downstream side of the guide roll 13. The intermittent feed roll 14 is linked with a motor rotating in an intermittent manner, so as to convey the container film 3 intermittently.

A heating device 15 and a pocket portion forming device 16 are sequentially placed along a conveyance path of the container film 3 between the guide roll 13 and the intermittent feed roll 14. The heating device 15 and the pocket portion forming device 16 configure the pocket portion forming unit according to the embodiment.

The heating device 15 includes an upper heater plate 15a and a lower heater plate 15b provided such as to be placed across the conveyance path of the container film 3. The heater plates 15a and 15b respectively have non-illustrated heaters for heating and are configured to be respectively movable in directions of becoming closer to or farther from the container film 3. The intermittently conveyed container film 3 is placed between the respective heater plates 15a and 15b during a temporary stop, so that forming areas for the pocket portions 2 in the container film 3 are partially heated to be softened.

The pocket portion forming device 16 includes an upper mold 16a and a lower mold 16b provided such as to be placed across the conveyance path of the container film 3, and is configured to form the pocket portions 2 by a plug assist pressure forming method. The pocket portion forming device 16 forms a plurality of pocket portions 2 simultaneously at predetermined positions of the container film 3 that is heated and relatively softened by the heating device 15 (pocket portion forming process). Another forming technique such as vacuum forming, pressure forming or plug forming may be employed in place of the plug assist pressure forming.

Formation of the pocket portions 2 is performed during an interval between conveying operations of the container film 3 by the intermittent feed roll 14. According to the embodiment, the pocket portion forming device 16 is configured to simultaneously form a total of twenty pocket portions 2 corresponding to two PTP sheets 1 by one operation. More specifically, the pocket portion forming device 16 is configured to simultaneously form five pocket portions in a film width direction of the container film 3 (Y-axis direction) and four pocket portions in a film conveyance direction (X-axis direction). In another example, the pocket portion forming device 16 may be configured to simultaneously form a different number of pocket portions 2.

The container film 3 fed from the intermittent feed roll 14 is sequentially laid on a tension roll 18, a guide roll 19 and a film receiving roll 20 in this order.

The film receiving roll 20 is linked with a motor rotating at a fixed speed, so as to continuously convey the container film 3 at a fixed speed. The tension roll 18 is configured to pull the container film 3 in a direction of applying tension by an elastic force. This configuration prevents a slack of the container film 3 due to a difference between the conveying operation by the intermittent feed roll 14 and the conveying operation by the film receiving roll 20 and constantly keeps the container film 3 in the state of tension.

An inspection device 21 and a tablet filling device 22 are sequentially placed along the conveyance path of the container film 3 between the guide roll 19 and the film receiving roll 20.

The inspection device 21 is configured to perform an inspection for the state of the container film 3 after formation of the pocket portions 2 by the pocket portion forming device 16 (inspection process). The detailed configuration of the inspection device 21 will be described later.

The tablet filling device 22 serves as the filling unit to automatically fill the pocket portions 2 with the tablets 5. The tablet filling device 22 opens a shutter at every predetermined time interval to drop the tablets 5, in synchronization with the conveying operation of the container film 3 by the film receiving roll 20. Each of the pocket portions 2 is filled with the tablet 5 by this shutter opening operation (filling process). The operation of the tablet filling device 22 is controlled by a filling control device 82 serving as the filling control unit as described later.

A film roll of the belt-shaped cover film 4 is, on the other hand, wound in a roll form on a most upstream side. A pullout end of the cover film 4 wound in the roll form is guided by a guide roll 24 to a heating roll 25. The heating roll 25 is pressed against to be in contact with the film receiving roll 20. The container film 3 and the cover film 4 are accordingly fed into between the two rolls 20 and 25.

The container film 3 and the cover film 4 pass through between the two rolls 20 and 25 in the heated and pressed contact state, so that the cover film 4 is mounted to the container film 3 such as to close the respective pocket portions 2 (mounting process). This series of operations manufactures the PTP film 6 as a belt-like body that has the pocket portions 2 respectively filled with the tablets 5. The film receiving roll 20 and the heating roll 25 configure the mounting unit according to the embodiment.

The PTP film 6 fed from the film receiving roll 20 is sequentially laid on a tension roll 27 and an intermittent feed roll 28 in this order.

The intermittent feed roll 28 is linked with a motor rotating in an intermittent manner, so as to convey the PTP film 6 intermittently. The tension roll 27 is configured to pull the PTP film 6 in a direction of applying tension by an elastic force. This configuration prevents a slack of the PTP film 6 due to a difference between the conveying operation by the film receiving roll 20 and the conveying operation by the intermittent feed roll 28 and constantly keeps the PTP film 6 in the state of tension.

The PTP film 6 fed from the intermittent feed roll 28 is sequentially laid on a tension roll 31 and an intermittent feed roll 32 in this order.

The intermittent feed roll 32 is linked with a motor rotating in an intermittent manner, so as to convey the PTP film 6 intermittently. The tension roll 31 is configured to pull the PTP film 6 in a direction of applying tension by an elastic force and thereby serves to prevent a slack of the PTP film 6 between these intermittent feed rolls 28 and 32.

A slit formation device 33 and a stamping device 34 are sequentially placed along the conveyance path of the PTP film 6 between the intermittent feed roll 28 and the tension roll 31. The slit formation device 33 serves to form cutting slits at predetermined positions of the PTP film 6. The stamping device 34 serves to stamp a mark at predetermined positions of the PTP film 6 (for example, in tag portions).

The PTP film 6 fed from the intermittent feed roll 32 is sequentially laid on a tension roll 35 and a continuous feed roll 36 in this order, downstream of the intermittent feed roll 32.

A sheet punching device 37 is placed along the conveyance path of the PTP film 6 between the intermittent feed roll 32 and the tension roll 35. The sheet punching device 37 serves as the sheet punching unit (separation unit) to punch out the outer periphery of each unit of PTP sheet 1 from the PTP film 6.

The respective PTP sheets 1 punched out by the sheet punching device 37 are conveyed by a take-out conveyor 38 and are temporarily accumulated in a finished product hopper 39 (separation process). In response to input of a defective signal from the filling control device 82 described later to a defective sheet discharge mechanism 40 serving as the discharge unit configured to selectively discharge the PTP sheet 1, the PTP sheet 1 determined as a defective is separately discharged by the defective sheet discharge mechanism 40 and is transferred to a non-illustrated defective hopper.

A cutting device 41 is provided downstream of the continuous feed roll 36. A scrap part 42 remaining in a belt shape after punching out by the sheet punching device 37 is guided by the tension roll 35 and the continuous feed roll 36 and is then led to the cutting device 41. A driven roll is pressed against to be in contact with the continuous feed roll 36, so that the scrap part 42 is placed and conveyed between the driven roll and the continuous feed roll 36.

The cutting device 41 serves to cut the scrap part 42 into predetermined dimensions. The cut pieces of the scrap part 42 are accumulated in a scrap hopper 43 and are then disposed separately.

Each of the rolls described above, such as the rolls 14, 19, 20, 28, 31 and 32, configuring the conveyance unit is arranged in such a positional relationship that the roll surface is opposed to the pocket portions 2. The surface of each roll, such as the surface of the roll 14, has recesses that are formed to place the pocket portions 2 therein. This configuration basically suppresses the pocket portions 2 from being crushed. The feeding operation with the pocket portions 2 placed in the respective recesses of each roll, such as the roll 14, achieves the reliable intermittent feed and continuous feed.

Figure 4:
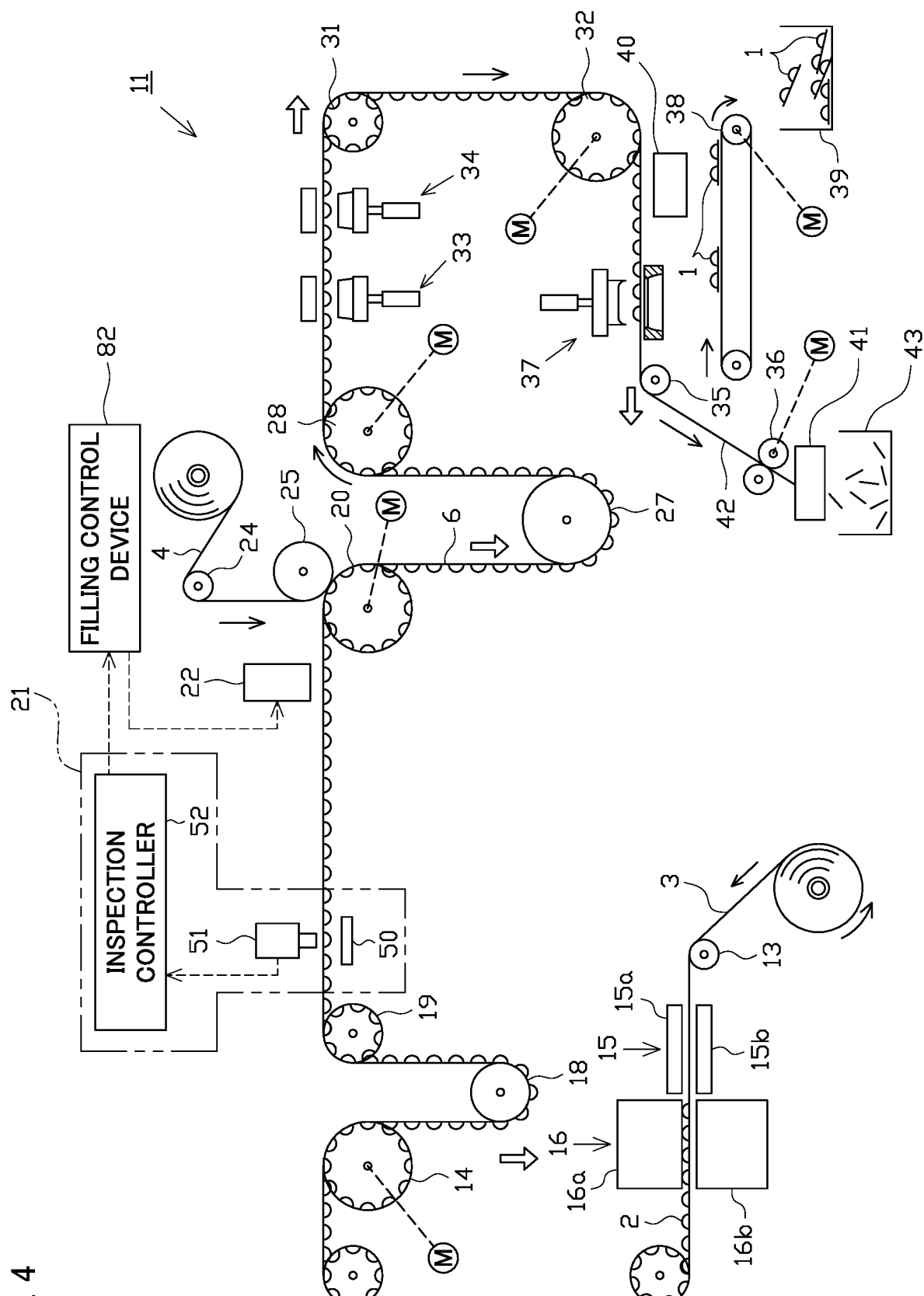
FIG. 4 is a schematic configuration diagram illustrating a PTP packaging machine.
Figure 5:
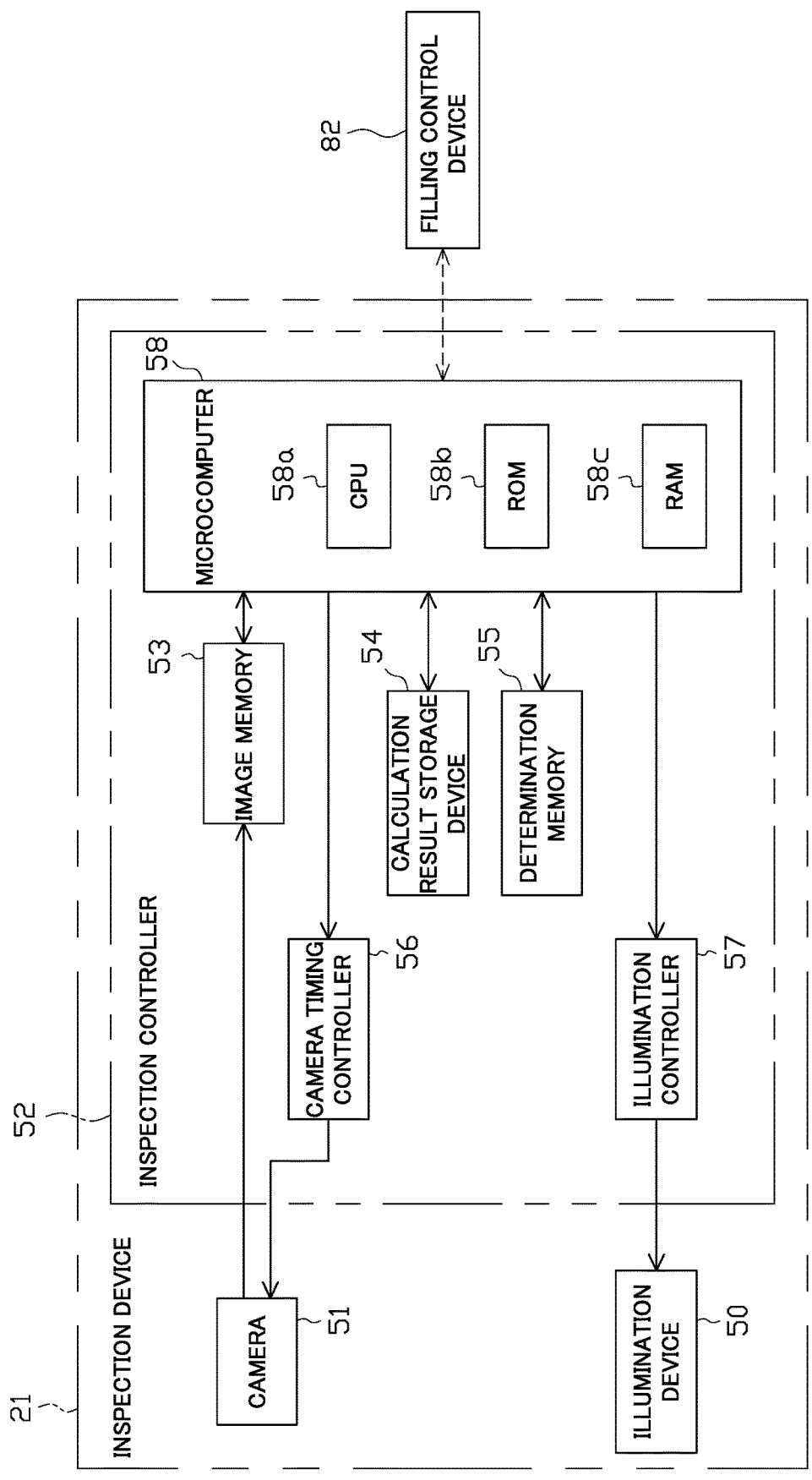
FIG. 5 is a block diagram illustrating the electrical configuration of an inspection device.
Figure 6:
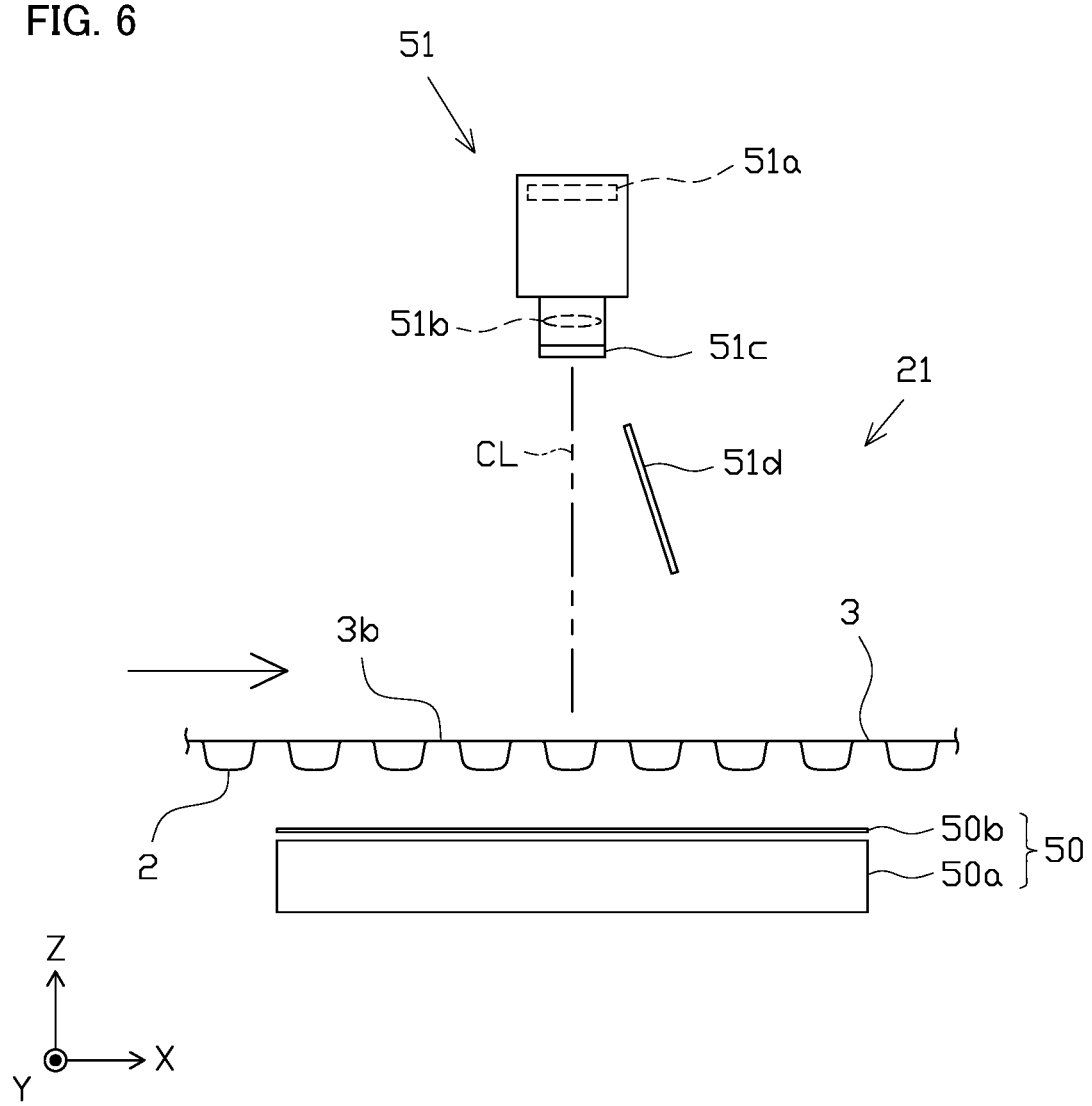
FIG. 6 is a schematic configuration diagram illustrating the inspection device.

The following describes the configuration of the inspection device 21 in detail. As shown in FIGS. 4 to 6, the inspection device 21 includes an illumination device 50 serving as the irradiation unit, a camera 51 serving as the imaging unit (or the imaging device), and an inspection controller 52 serving to control the illumination device 50 and the camera 51.

The illumination device 50 is placed on one side in a normal direction of the container film 3 conveyed in a horizontal direction (on a lower side that is a protrusion side of the pocket portions 2 according to the embodiment).

The illumination device 50 includes a light radiation unit 50a and a diffusion plate 50b provided to cover the light radiation unit 50a and is configured to allow for surface emission. The illumination device 50 according to the embodiment irradiates a predetermined range of the container film 3 with ultraviolet light.

The camera 51 is, on the other hand, placed on the other side in the normal direction of the container film 3 conveyed in the horizontal direction (on an upper side that is an opening side of the pocket portions 2 according to the embodiment).

The camera 51 includes an imaging element 51a, a lens 51b serving as the predetermined optical system, a bandpass filter 51c and a mirror 51d. The camera 51 is placed such that an optical axis CL of the lens 51b is along the normal direction of the container film 3 (the bottom portions 2a of the pocket portions 2 and the flange portion 3b) or, in other words, along a vertical direction perpendicular to the container film 3 (Z-axis direction).

A known CCD area sensor having sensitivity in a wavelength range of ultraviolet light emitted from the illumination device 50 is adopted for the imaging element 51a according to the embodiment. The CCD area sensor has a light receiving surface where a plurality of light receiving elements are arrayed two-dimensionally in the form of a matrix. The imaging element 51 is, however, not limited to this example but may be another sensor having sensitivity in the wavelength range of ultraviolet light. The imaging element 51 may be, for example, a CMOS sensor or the like.

The lens 51b used according to the embodiment is a lens configured to correct a field curvature. The field curvature denotes an optical aberration that causes a focusing surface parallel to a lens not to become a flat plane on an object side relative to a flat plane on an imaging side of the lens.

Figure 7:
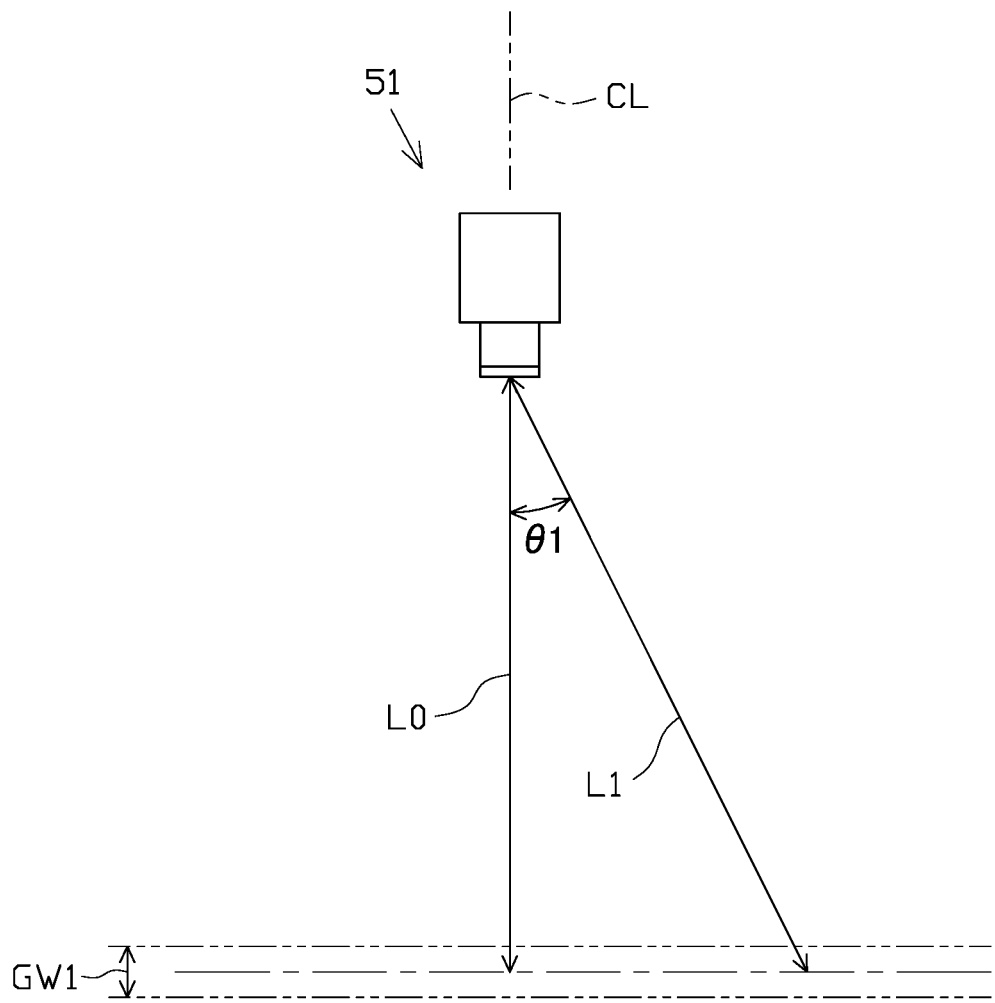
FIG. 7 is a schematic diagram illustrating a focusing range in the case of using a lens configured to correct a field curvature.

Using the lens 51b configured to correct the field curvature causes the focusing surface on the object side (on the container film 3-side) to become a flat plane relative to a flat plane on the imaging side (a light receiving surface of the imaging element 51a). For example, as shown in FIG. 7, in a configuration with omission of the mirror 51d, a distance (optical path length) from the camera 51 to a height position of a midportion in a focusing range of the camera 51 (a first focusing range GW1) is a distance L0 at a center position in the field of vision of the camera 51 (at a position of the optical axis CL of the lens 51b) but is a distance L1, which is longer than the distance L0, at an end in the field of vision of the camera 51 (an angle of view=2×θ1).

According to the embodiment, the mirror 51d described above is placed in this configuration. The mirror 51d has a rectangular flat plate-like shape and has an approximately identical length with a film width of the container film 3 in the film width direction (Y-axis direction).

Figure 8:
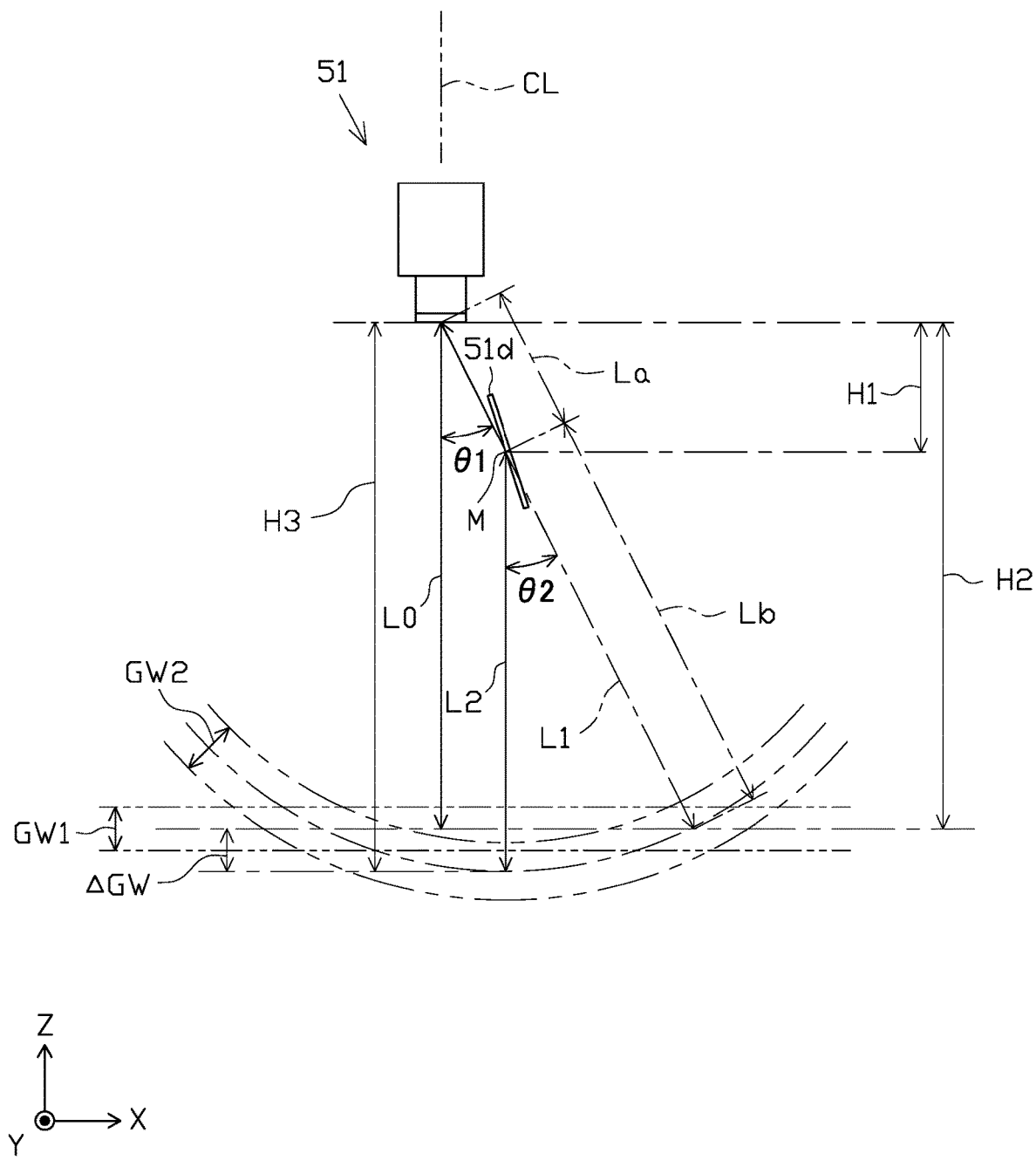
FIG. 8 is a schematic diagram illustrating a focusing range in the case of arranging a mirror.

The mirror 51d is placed at such a position that a center position M of the mirror 51d intersects with an optical path of light entering the camera 51 (the lens 51b) at an angle θ1 in an X-Z plane of FIG. 8. According to the embodiment, however, an angle of view of the lens 51b is "2×θ1". Accordingly, the mirror 51d is placed at such a position as to intersect with an optical path that passes through an end of the angle of view of the lens 51b in the film conveyance direction (X-axis direction).

In the X-Z plane of FIG. 8, "L0" denotes an optical path of transmitted light that enters the camera 51 (the lens 51b) along the position of the center in the field of vision of the camera 51 (the position of the optical axis CL) and also denotes an optical path length from a height position of a midportion in a first focusing range GW1 which this transmitted light follows, to the camera 51.

"L1" denotes a virtual optical path of transmitted light that enters the camera 51 (the lens 51b) at an angle θ1 in a configuration with omission of the mirror 51d, and also denotes an optical path length from the height position of the midportion in the first focusing range GW1 which this transmitted light follows, to the camera 51.

"L2" denotes a refraction optical path of transmitted light that enters the camera 51 (the lens 51b) at the angle θ1 in a configuration with the mirror 51d placed therein, and also denotes an optical path length from a height position of a midportion in a second focusing range GW2 where this transmitted light follows, to the camera 51.

"θ1" denotes an angle of incidence of the transmitted light that enters the camera 51 (the lens 51b). "θ2" denotes an angle of inclination between an object-side section of the above refraction optical path L2 from the height position of the midportion in the second focusing range GW2 to the mirror 51d, and the virtual optical path L1. According to the embodiment (shown in FIG. 8), the angle of incidence θ1 and the angle of inclination θ2 described above are set to be identical with each other. In other words, the angles θ1 and θ2 are set such that transmitted light entering along the Z-axis direction from a position immediately below the center position M of the mirror 51d is reflected by the mirror 51d and enters the camera 51 at the angle of incidence θ1.

"H1" denotes a distance (height difference) from the camera 51 to the center position M of the mirror 51d in a direction of the optical axis CL (Z-axis direction).

"H2" denotes a distance (height difference) from the camera 51 to the height position of the midportion in the first focusing range GW1 in the direction of the optical axis CL (Z-axis direction).

"H3" denotes a distance (height difference) from the camera 51 to the height position of the midportion in the second focusing range GW2 in the direction of the optical axis CL (Z-axis direction).

"ΔGW" denotes a height difference between the height position of the midportion in the first focusing range GW1 and the height position of the midportion in the second focusing range GW2. The height difference ΔGW is unequivocally determined from the angle of view "2×θ1" of the lens 51b, the height difference H1 between the camera 51 and the mirror 51d, and the angle of inclination θ2 between the object-side section of the refraction optical axis L1 and the virtual optical axis L1 described above.

The configuration of placing the mirror 51*d* such as to refract the optical path of transmitted light as described above enables the second focusing range GS2 that is brought into focus via the mirror 51*d* to be set. As shown in FIG. 8, the second focusing range GW2 is an arc-shaped focusing range including an arc-shaped midportion of a radius Lb(=L1−La) centered at the center position M of the mirror 51*d*. The position immediately below the center position M of the mirror 51*d* forms a lowest end of the second focusing range GW2 and provides a maximum value of the height difference ΔGW.

The bandpass filter 51*c* is provided to cause only ultraviolet light to enter the lens 51*b*. This configuration causes only the ultraviolet light transmitted through the container film 3, out of the ultraviolet light radiated from the illumination device 50, to be subjected to two-dimensional imaging by the camera 51.

Transmission image data thus obtained by the camera 51 are luminance image data having different luminance values at respective pixels (at respective coordinate positions), based on a difference in transmittance of the ultraviolet light in the container film 3.

According to this embodiment, the band pass filter 51*c* used is, for example, a bandpass filter that allows for transmission of only ultraviolet light having a wavelength of 253±20 nm, which provides the transmittance of the container film 3 of about 30±10 percent. This is because both an excessively high transmittance and an excessively low transmittance of the light transmitted through the container film 3 may fail to make a distinct difference in the transmittance of light between a thin wall location and a thick wall location, for example, in the bottom portion 2*a* of the pocket portion 2 or in the flange portion 3*b*.

The field of vision (imaging range) of the camera 51 according to the embodiment is set to simultaneously image a range including at least one pocket portion array located at a predetermined position in the film conveyance direction of the container film 3 (X-axis direction), i.e., a range including five pocket portions 2 in the film width direction of the container film 3 (Y-axis direction) and one pocket portion 2 in the film conveyance direction (X-axis direction).

The inspection controller 52 is configured by a so-called computer system including, for example, a central processing unit (CPU) and a random access memory (RAM), and includes an image memory 53, a calculation result storage device 54, a determination memory 55, a camera timing controller 56, an illumination controller 57 and a microcomputer 58 electrically connected with the foregoing elements.

The image memory 53 is configured to store therein a variety of image data, for example, masking image data obtained in a masking process and binarized image data obtained in a binarization process during an inspection, as well as the transmission image data obtained by the camera 51.

The calculation result storage device 54 is configured to store therein inspection result data and statistical data obtained by stochastically processing the inspection result data.

The determination memory 55 is configured to store therein a variety of information used for the inspection. This variety of information set and stored includes, for example, the shapes and the dimensions of the PTP sheet 1, the pocket portions 2 and the tablets 5, the shape and the dimensions of an inspection frame provided to define an inspection range (an approximately rectangular range including one pocket portion array comprised of five pocket portions 2) and a relative positional relationship of this inspection frame to the camera 51, the shape and the dimensions of pocket frames provided to define areas of the pocket portions 2 and relative positional relationships of these pocket frames to the camera 51 (or to the inspection frame), a luminance threshold value in the binarization process, and a determination criterion used for good/poor quality judgment of the container film 3 (the pocket portions 2 and the flange portion 3*b*).

The camera timing controller 56 is configured to control the execution timing of an imaging process by the camera 51. This timing is controlled, based on a signal from an non-illustrated encoder provided in the PTP packaging machine 11. Accordingly, the inspection controller 52 configures the imaging control unit according to the embodiment.

The illumination controller 57 is configured to control the illumination device 50 such as to turn on the light radiation unit 50*a* and irradiate a predetermined range of the container film 3 with ultraviolet light, in synchronism with the execution timing of the imaging process by the camera 51.

Every time the container film 3 is conveyed by a predetermined amount, the container film 3 is accordingly irradiated with the ultraviolet light emitted from the illumination device 50, and an image of the ultraviolet light transmitted through the container film 3 is taken by the camera 51. The transmission image data obtained by the camera 51 is converted into a digital signal (image signal) inside of the camera 51 and is taken into the inspection controller 52 (the image memory 53) in the form of the digital signal.

The microcomputer 58 includes, for example, a CPU 58*a* serving as the arithmetic unit, a ROM 58*b* serving to store various programs, and a RAM 58*c* serving to temporarily store various data such as calculation data and input/output data, and is configured to perform various controls in the inspection controller 52.

The microcomputer 58 executes various processing programs for performing the inspection with using, for example, the contents of storage in the determination memory 55. The microcomputer 58 is also configured to send and receive signals to and from the filling control device 82 described below and to output, for example, an inspection result to the filling control device 82.

The following describes the filling control device 82. The filling control device 82 is provided to control filling of the tablets 5 by the tablet filling device 22 and is configured by a computer system including, for example, a CPU and a RAM.

The filling control device 82 according to the embodiment is configured to control switching whether a predetermined pocket portion 2 is to be filled with the tablet 5, based on the inspection result by the inspection device 21.

More specifically, when an inspection result with regard to a predetermined PTP sheet 1 (the state of ten pocket portions 2 and the state of the flange portion 3*b*) is input from the inspection device 21 and indicates a non-defective determination result, the filling control device 82 controls the tablet filling device 22 such as to fill all the ten pocket portions 2 included in this PTP sheet 1 with the tablets 5.

When the inspection result with regard to the predetermined PTP sheet 1 indicates a defective determination result, on the other hand, the filling control device 82 controls the tablet filling device 22 such as not to fill any of the ten pocket portions 2 included in this PTP sheet with the tablet 5. Simultaneously, the filling control device 82 outputs a defective signal to the defective sheet discharge mechanism 40. As a result, the defective sheet discharge mechanism 40 discharges the PTP sheet 1 relating to the defective signal (defective sheet).

The following describes the flows of a flange portion inspection and a pocket portion inspection performed by the inspection device 21.

Figure 9:
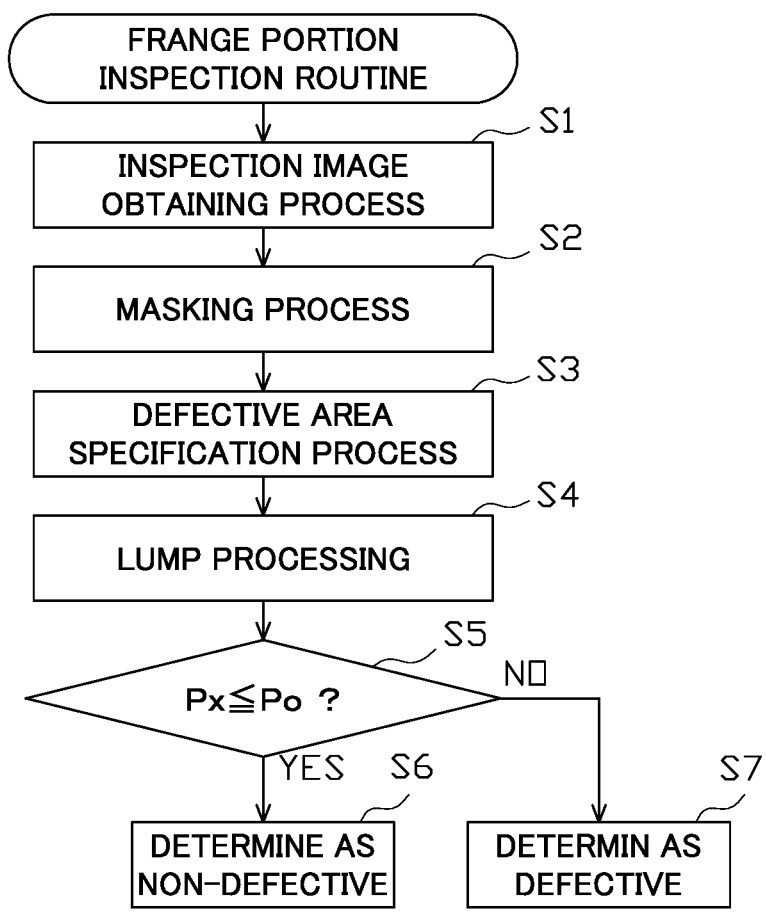
FIG. 9 is a flowchart showing a flange portion inspection routine.

The flange portion inspection is described first with reference to the flowchart of FIG. 9. An inspection routine with regard to the flange portion inspection (flange portion inspection routine) shown in FIG. 9 is a process performed for every predetermined inspection range including one pocket portion array (five pocket portions 2) arrayed along the film width direction as described below in detail. An area corresponding to the flange portion 3b in this inspection range corresponds to the first inspection area according to the embodiment.

Figure 10:
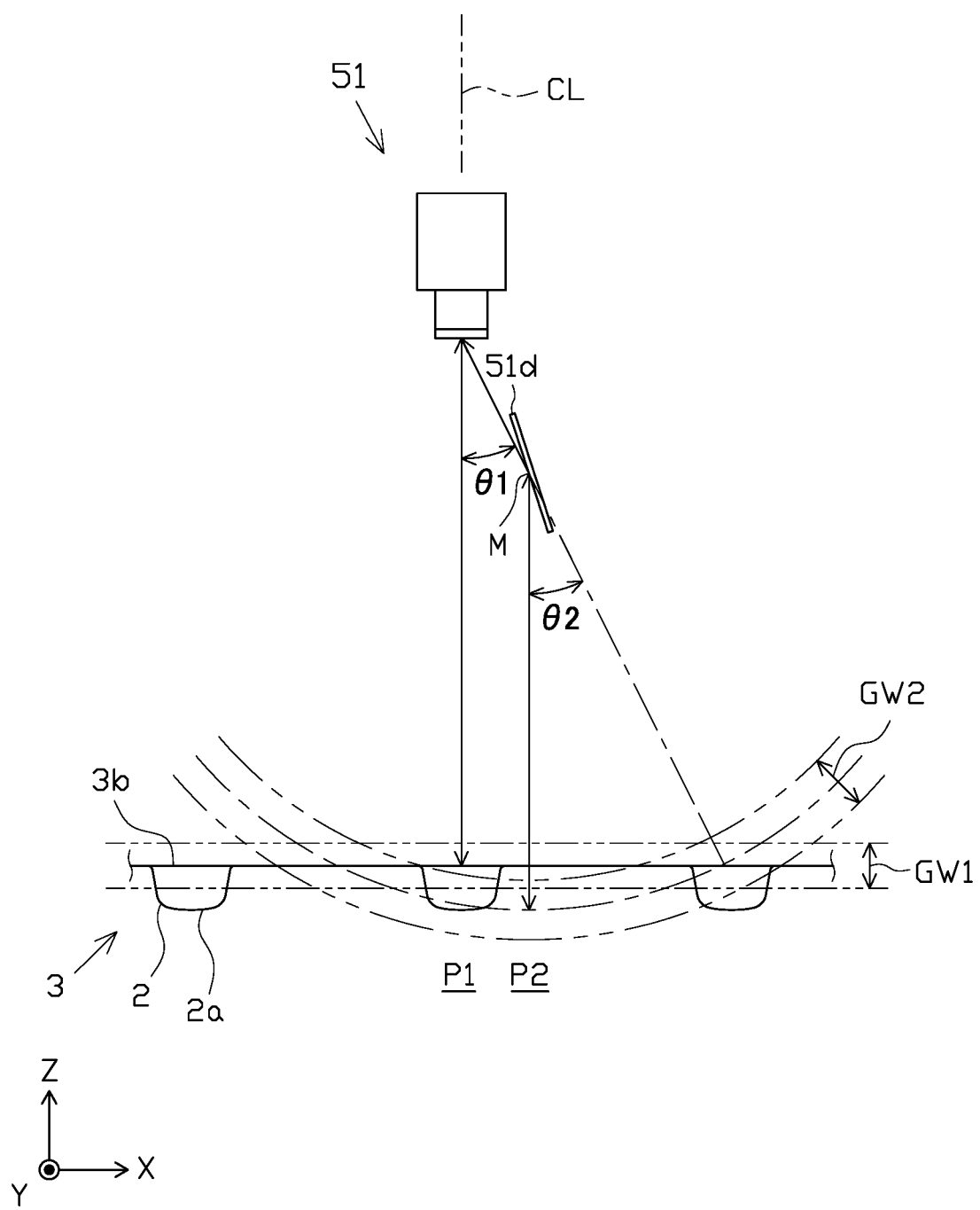
FIG. 10 is a schematic diagram illustrating a positional relationship between a camera 51 and a container film 3 at an execution timing of a first imaging process.

As shown in FIG. 10, when a predetermined position in the film conveyance direction of the container film 3 with the pocket portions 2 formed therein (a center position of the bottom portion 2a of the pocket portion 2 in the film conveyance direction according to the embodiment) reaches a position P1 immediately below the camera 51 (the optical axis CL of the lens 51b) in the film conveyance direction, at least the flange portion 3b is located within the first focusing range GW1 in the field of vision (imaging range) of the camera 51.

At this timing, the inspection controller 52 performs an inspection image obtaining process (step S1). More specifically, the inspection controller 52 performs irradiation (irradiation process) that irradiates a predetermined range of the container film 3 including the above inspection range with ultraviolet light emitted from the illumination device 50, and also performs first imaging (first imaging process) that takes an image of the predetermined range including the above inspection range by using the camera 51.

Figure 13:
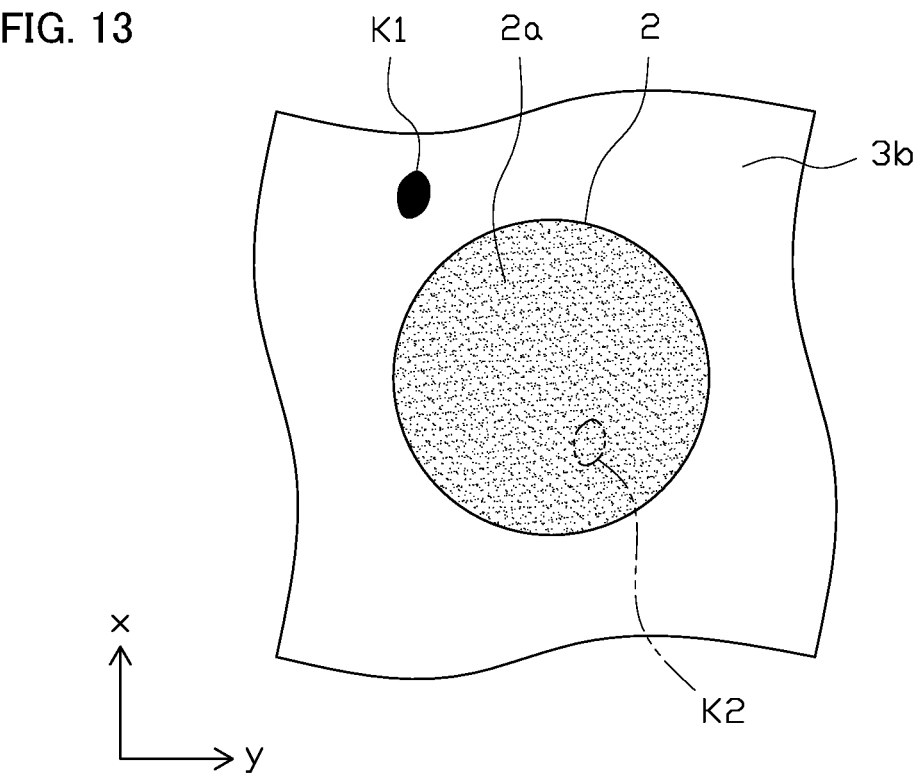
FIG. 13 is a partly enlarged view schematically illustrating image data obtained by the first imaging process.

As shown in FIG. 13, transmission image data taken and obtained by the camera 51 at this timing includes a focused image of the flange portion 3b of the container film 3 and an out-of-focus image of the bottom portion 2a of the pocket portion 2. Accordingly, in this transmission image data, while a foreign substance K1 that is present on the flange portion 3b is clearly recognizable, a foreign substance K2 (shown in FIG. 14) that is actually present on the bottom portion 2a of the pocket portion 2 is too obscure and unclear to be recognized.

When such transmission image data of the container film 3 is taken into the image memory 53, image data with regard to a predetermined inspection range including one pocket portion array (five pocket portions 2) is obtained as an inspection image for flange portion inspection by using the above inspection frame, based on this transmission image data.

A modified configuration may process the obtained inspection image by any of various processings. For example, there are technical limitations in uniformly irradiating an entire imaging range of the camera 51 with light emitted from the illumination device 50. The modified configuration may thus perform shading correction to correct a variation in light intensity (luminance) caused by a difference in position.

When the inspection image is obtained, the inspection controller 52 performs a masking process at subsequent step S2. More specifically, the inspection controller 52 sets the pocket frames described above corresponding to the respective positions of the five pocket portions 2 on the inspection image obtained at step S1 and applies a mask over areas corresponding to the pocket portions 2 specified by the pocket frames.

According to the embodiment, the set positions of the pocket frames are determined in advance according to the relative positional relationships to the inspection frame described above. Accordingly, the configuration of the embodiment does not need to adjust the set positions of the pocket frames in each inspection image. This configuration is, however, not essential. A modified configuration may take into account the possible occurrence of a positional misalignment or the like and appropriately adjust the set positions of the pocket frames, based on information obtained from the inspection image.

At subsequent step S3, the inspection controller 52 performs a defective area specification process. According to the embodiment, the inspection controller 52 determines whether a luminance value in each of the pixels of the inspection image processed by the masking process at step S2 satisfies a predetermined determination criterion set in advance with regard to each pixel (whether the luminance value is within a predetermined allowable range) and specifies the pixel out of the determination criterion as a defective area.

For example, the inspection controller 52 performs a binarization process using an upper limit value and a lower limit value of the allowable range as luminance threshold values. As a result, each location having a high light transmittance, for example, a thin-wall defective location or a perforated defective location, is detected as a "light portion" that exceeds the upper limit value of the allowable range. Each location having a low light transmittance, for example, a location where a foreign substance K1 (shown in FIG. 13) is present or a scar-like defective location, is, on the other hand, detected as a "dark portion" that is lower than the lower limit value of the allowable range.

At subsequent step S4, the inspection controller 52 performs lump processing. More specifically, the inspection controller 52 specifies connecting components with regard to each of the "dark portions" and the "light portions" obtained at step S3 and calculates a total defective area Px that is a sum of area values P of the connecting components of the "dark portions" and the "light portions" specified as the defective areas.

At step S5, the inspection controller 52 determines whether the total defective area Px calculated at step S4 is equal to or smaller than a preset determination criterion Po. This determines whether the total defective area Px is within the allowable range and thereby performs good/poor quality judgment with regard to the flange portion 3b. The function of performing the good/poor quality judgment (good/poor quality judgment process) of step S5 accordingly configures the good/poor quality judgment unit according to the embodiment.

This configuration is, however, not essential. A modified configuration may perform the good/poor quality judgment by another method, for example, a method of determining whether a connecting component having a maximum area, out of the connecting components of the "dark portions" and the "light portions" specified as the defective areas, is within the allowable range or a method of determining a degree of variation (state of distribution) of the connecting components of the "dark portions" and the "light portions". Another modified configuration may determine the inspection range having even one defective area, as a defective, regardless of the size of the defective area.

In the case of affirmative determination that the total defective area Px is equal to or smaller than the determination criterion Po at step S5, the inspection controller 52 determines that the current inspection range is "non-defective" at step S6 and then terminates this inspection routine.

In the case of negative determination at step S5, on the other hand, the inspection controller 52 determines that the current inspection range is "defective" at step S7 and then terminates this inspection routine.

In the non-defective determination process of step S6 and in the defective determination process of step S7, the inspection controller 52 stores the inspection result with regard to the current inspection range into the calculation result storage device 54 and also outputs the inspection result with regard to the current inspection range to the filling control device 82.

Figure 11:
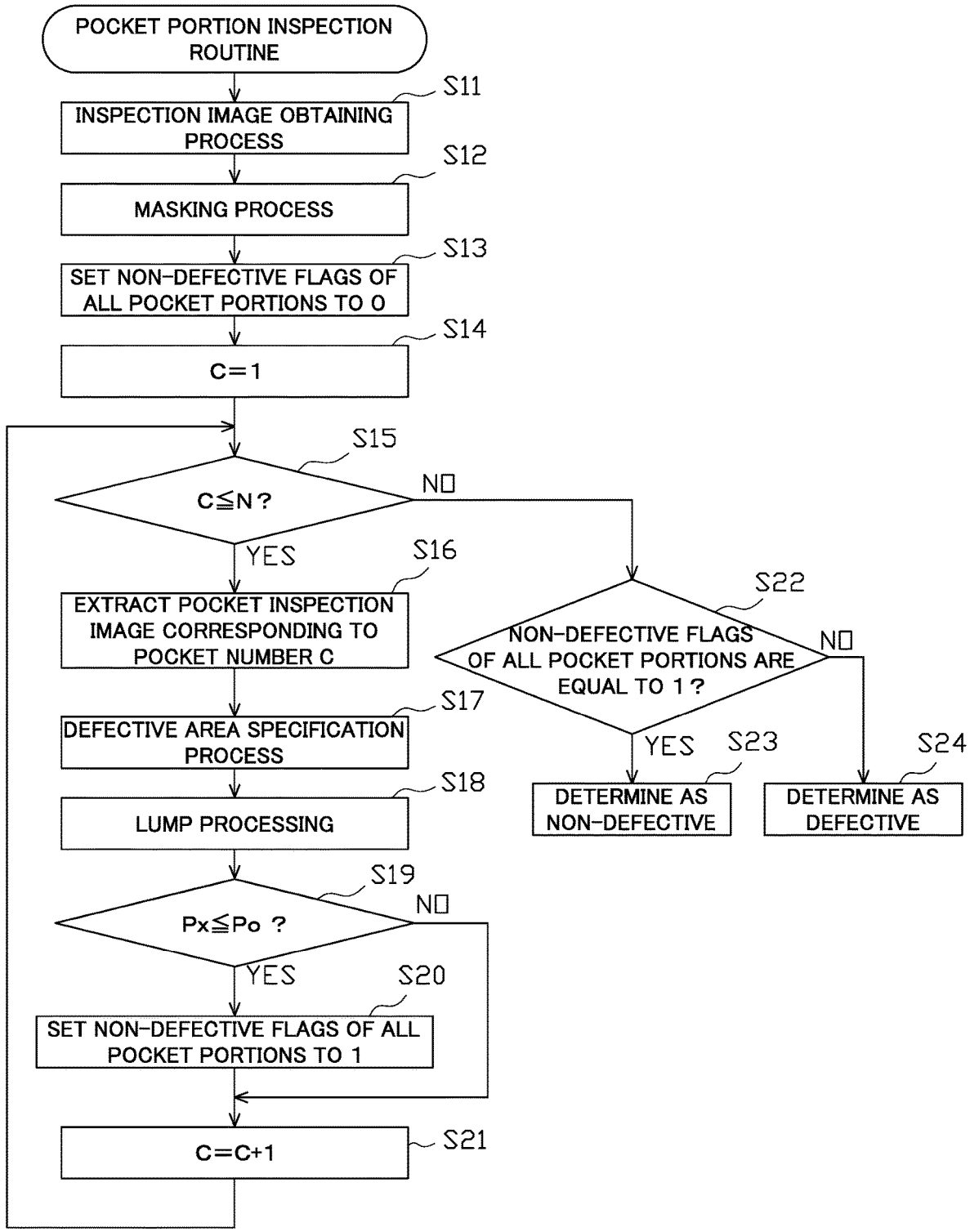
FIG. 11 is a flowchart showing a pocket portion inspection routine.

The following describes the pocket portion inspection with reference to the flowchart of FIG. 11. Like the flange portion inspection routine described above, an inspection routine with regard to the pocket portion inspection (pocket portion inspection routine) shown in FIG. 11 is a process performed for every predetermined inspection range including one pocket portion array (five pocket portions 2) arrayed along the film width direction as described below in detail. An area corresponding to the bottom portions 2a of the five pocket portions 2 in this inspection range corresponds to the second inspection area according to the embodiment as described below in detail.

Figure 12:
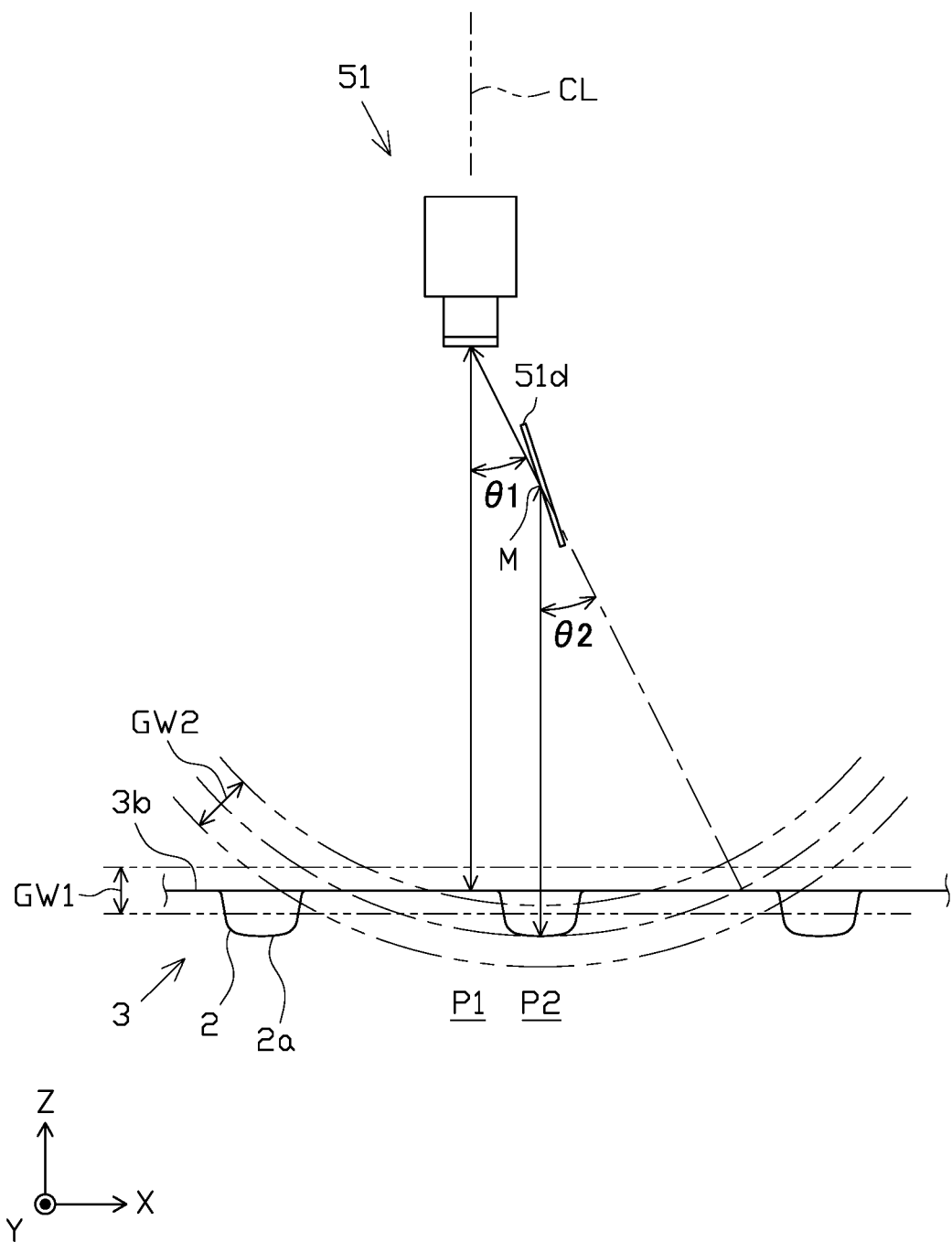
FIG. 12 is a schematic diagram illustrating a positional relationship between the camera 51 and the container film 3 at an execution timing of a second imaging process.

As shown in FIG. 12, when a predetermined position in the film conveyance direction of the container film 3 with the pocket portions 2 formed therein (a center position of the bottom portion 2a of the pocket portion 2 in the film conveyance direction according to the embodiment) reaches a position P2 immediately below the mirror 51d in the film conveyance direction, at least the bottom portion 2a of the pocket portion 2 is located within the second focusing range GW2 in the field of vision (imaging range) of the camera 51.

At this timing, the inspection controller 52 performs an inspection image obtaining process (step S11). More specifically, the inspection controller 52 performs irradiation (irradiation process) that irradiates a predetermined range of the container film 3 including the above inspection range with ultraviolet light emitted from the illumination device 50, and also performs second imaging (second imaging process) that takes an image of the predetermined range (imaging range) including the above inspection range by using the camera 51.

Figure 14:
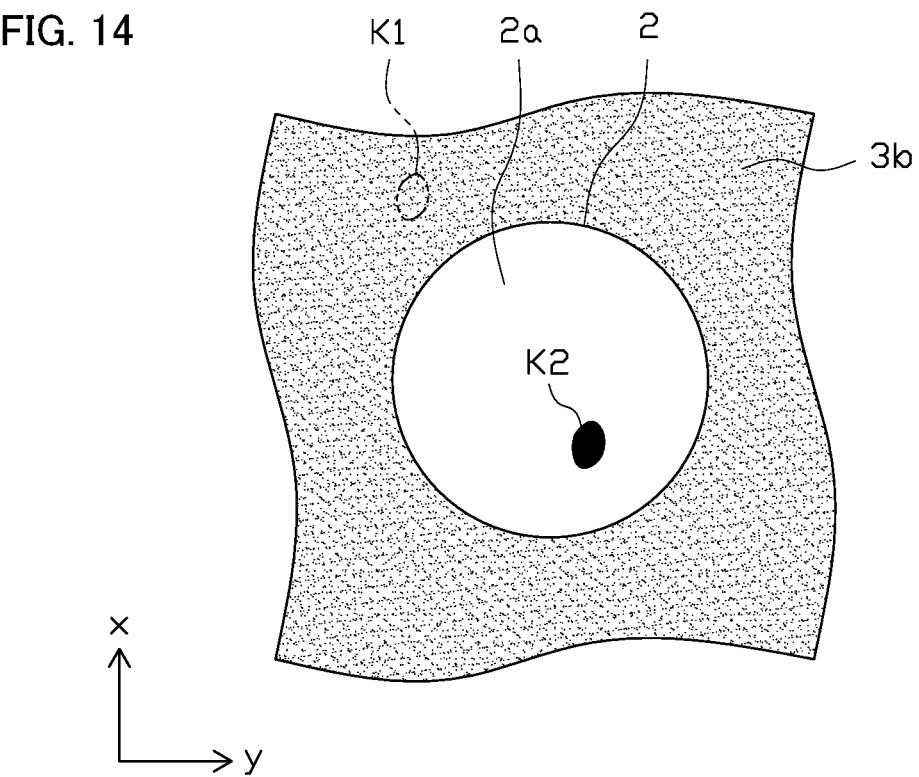
FIG. 14 is a partly enlarged view schematically illustrating image data obtained by the second imaging process.

As shown in FIG. 14, transmission image data taken and obtained by the camera 51 at this timing includes a focused image of the bottom portion 2a of the pocket portion 2 and an out-of-focus image of the flange portion 3b of the container film 3. Accordingly, in this transmission image data, while the foreign substance K2 that is present on the bottom portion 2a of the pocket portion 2 is clearly recognizable, the foreign substance K1 that is actually present on the flange portion 3b is too obscure and unclear to be recognized.

When such transmission image data of the container film 3 is taken into the image memory 53, image data with regard to a predetermined inspection range including one pocket portion array (five pocket portions 2) is obtained as an inspection image for pocket portion inspection by using the above inspection frame, based on this transmission image data.

Like the flange portion inspection routine described above, a modified configuration may process the obtained inspection image by any of various processings. For example, the modified configuration may perform shading correction to correct a variation in light intensity (luminance).

When the inspection image is obtained, the inspection controller 52 performs a masking process at subsequent step S12. More specifically, the inspection controller 52 sets the pocket frames described above corresponding to the respective positions of the five pocket portions 2 on the inspection image obtained at step S11 and applies a mask over an area other than the pocket portions 2 specified by the pocket frames, i.e., an area corresponding to the flange portion 3b.

The inspection controller 52 subsequently sets values of a pocket non-defective flag of all the pocket portions 2 to "0" at step S13.

The "pocket non-defective flag" indicates a result of the good/poor quality judgment with respect to each corresponding pocket portion 2 and is set in the calculation result storage device 54. In the case where a predetermined pocket portion 2 is determined as non-defective, the value of the pocket non-defective flag corresponding to the predetermined pocket portion 2 is set to "1".

At subsequent step S14, the inspection controller 52 sets a value C of a pocket number counter set in the calculation result storage device 54 to an initial value "1".

The "pocket number" is a serial number set corresponding to each of five pocket portions 2 included in one inspection range. The position of each pocket portion 2 is specified by the value C of the pocket number counter (hereinafter simply referred to as "pocket number C").

The inspection controller 52 then determines whether the pocket number C is equal to or smaller than the number of pockets N ("5" according to the embodiment) included in one inspection range at step S15.

In the case of an affirmative determination, the inspection controller 52 proceeds to step S16 to extract a pocket inspection image with regard to the pocket portion 2 specified by the current pocket number C.

More specifically, the inspection controller 52 extracts a grayscale image in a pocket frame with regard to the pocket portion 2 corresponding to the current pocket number C (for example, C=1) in the inspection image (masking image data) processed by the masking process at step S12, as the pocket inspection image.

At subsequent step S17, the inspection controller 52 performs a defective area specification process. According to the embodiment, the inspection controller 52 first determines whether a luminance value in each of the pixels of the pocket inspection image extracted at step S16 satisfies a predetermined determination criterion set in advance with regard to each pixel (whether the luminance value is within a predetermined allowable range) and specifies the pixel out of the determination criterion as a defective area.

For example, like the flange portion inspection routine described above, the inspection controller 52 performs a binarization process using an upper limit value and a lower limit value of the allowable range as luminance threshold values. As a result, each location having a high light transmittance, for example, a thin-wall defective location or a perforated defective location, is detected as a "light portion" that exceeds the upper limit value of the allowable range. Each location having a low light transmittance, for example, a location where a foreign substance K2 (shown in FIG. 14) is present or a scar-like defective location, is, on the other hand, detected as a "dark portion" that is lower than the lower limit value of the allowable range.

At subsequent step S18, the inspection controller 52 performs lump processing. More specifically, the inspection controller 52 specifies connecting components with regard to each of the "dark portions" and the "light portions" obtained at step S17 and calculates a total defective area Px that is a sum of area values P of the connecting components of the "dark portions" and the "light portions" specified as the defective areas.

At step S19, the inspection controller 52 determines whether the total defective area Px calculated at step S18 is equal to or smaller than a preset determination criterion Po. This determines whether the total defective area Px is within the allowable range and thereby performs good/poor quality judgment with regard to the pocket portion 2. The function of performing the good/poor quality judgment (good/poor quality judgment process) of step S19 accordingly configures the good/poor quality judgment unit according to the embodiment.

This configuration is, however, not essential. Like the flange portion inspection routine described above, a modified configuration may perform the good/poor quality judgment by another method, for example, a method of determining whether a connecting component having a maximum area, out of the connecting components of the "dark portion" and the "light portions" specified as the defective area, is within the allowable range or a method of determining a degree of variation (state of distribution) of the connecting components of the "dark portions" and the "light portions". Another modified configuration may determine the inspection range having even one defective area, as a defective, regardless of the size of the defective area.

In the case of affirmative determination that the total defective area Px is equal to or smaller than the determination criterion Po at step S19, the inspection controller 52 proceeds to step S20. In the case of negative determination, on the other hand, the inspection controller 52 regards that the pocket portion 2 corresponding to the current pocket number C is defective and proceeds to step S21.

At step S20, the inspection controller 52 regards that the pocket portion 2 corresponding to the current pocket number C is non-defective, sets the value of the pocket non-defective flag corresponding to the pocket number C to "1" and then proceeds to step S21.

At step S21, the inspection controller 52 adds "1" to the current pocket number C and then returns to step S15.

When the newly set pocket number C is still equal to or smaller than the number of pockets N, the inspection controller 52 proceeds to step S16 again to execute the above series of processing again.

When it is determined that the newly set pocket number exceeds the number of pockets N, on the other hand, the inspection controller 52 regards that the good/poor quality judgment is completed with regard to all the pocket portions 2 and then proceeds to step S22.

At step S22, the inspection controller 52 determines whether the value of the pocket non-defective flag is equal to "1" with regard to all the pocket portions 2 included in the inspection range.

In the case of affirmative determination, i.e., in the case where all the pocket portions 2 included in the inspection range are "non-defective" and there is no pocket portion 2 determined as "defective", the inspection controller 52 determines that the current inspection range is "non-defective" at step S23 and then terminates this inspection routine.

In the case of negative determination at step S22, i.e., in the case where there is any one pocket portion 2 determined as "defective" in the inspection range, on the other hand, the inspection controller 52 determines that the current inspection range is "defective" at step S24 and then terminates this inspection routine.

In the non-defective determination process of step S23 and in the defective determination process of step S24, the inspection controller 52 stores the inspection result with regard to the current inspection range into the calculation result storage device 54 and also outputs the inspection result with regard to the current inspection range to the filling control device 82.

As described above in detail, the camera 51 according to the embodiment includes the lens 51b configured to correct the field curvature, and the mirror 51d configured to reflect the transmitted light, which enters from the container film 3, toward the lens 51b. The camera 51 has the second focusing range GW2 that is placed at the lower position than the first focusing range GW1 and that is brought into focus via the mirror 51d, as well as the first focusing range GW1 that is brought into focus without the mirror 51d.

With regard to the flange portion 3b of the container film 3 that is brought into focus even by direct imaging without the mirror 51d, the first imaging process is performed to take an image of the inspection range including the flange portion 3b at a first timing when the flange portion 3b is located within the first focusing range GW1 (at the timing when the center position of the bottom portion 2a of the pocket portion 2 in the film conveyance direction passes through the position P1 immediately below the camera 51 in the film conveyance direction according to the embodiment).

With regard to the bottom portion 2a of the pocket portion 2 that is brought into focus via the mirror 51d (that is not brought into focus by direct imaging without the mirror 51d), on the other hand, the second imaging process is performed to take an image of the inspection range including the bottom portions 2a of the pocket portions 2 at a second timing when the bottom portion 2a of the pocket portion 2 is located within the second focusing range GW2 (at the timing when the center position of the bottom portion 2a of the pocket portion 2 in the film conveyance direction passes through the position P2 immediately below the mirror 51d in the film width direction according to the embodiment).

The configuration of the embodiment performs the flange portion inspection based on a first inspection image (flange portion inspection image) obtained by the first imaging process to perform the good/poor quality judgment, while performing the pocket portion inspection based on a second inspection image (pocket portion inspection image) obtained by the second imaging process to perform the good/poor quality judgment.

As a result, the configuration of the embodiment enables focused image data (the flange portion inspection image and the pocket portion inspection image) to be obtained with regard to each of a plurality of inspection areas (the flange portion 3b and the bottom portions 2a of the pocket portions 2) having different heights in the container film 3 by using only one camera 51 and using only one mirror 51d without requiring multiple mirrors, and enhances the inspection accuracy.

This accordingly simplifies the configuration of the inspection device 21 and the focusing operation of the inspection device 21, and also enables the inspection device 21 to be manufactured inexpensively and enhances the versatility of the inspection device 21.

The present disclosure is not limited to the description of the above embodiment but may be implemented, for example, by configurations described below. The present disclosure may also be naturally implemented by applications and modifications other than those illustrated below.

(a) The configuration of the packaging container that is the inspection object is not limited to the configuration of the embodiment described above. For example, in the embodiment described above, the PTP sheet 1 with the contents such as the tablets 5 placed therein is illustrated as the blister pack.

This is, however, not essential. The inspection object may be any of various blister packs, for example, a peel open-type blister pack configured such that the content thereof is taken out by peeling off a cover film from a container film (for example, a portion pack for placing food stuff or the like therein), a blister pack configured such that the content thereof such as an electronic component is placed and conveyed (for example, a carrier tape), and a blister pack of such a type that a cover film is not mounted to a container film but a mount or the like is assembled to the container film.

(b) The configuration of the pocket portions in the container film, for example, the shape, the size, the depth, the number, and the arrangement of the pocket portions, is not limited to the configuration described in the above embodiment but may be appropriately selected according to, for example, the type, the shape, and the application of the content. For example, the bottom portion 2a of the pocket portion 2 may have an approximately triangular shape, an approximately elliptical shape, an approximately rectangular shape, or an approximately rhombic shape in plan view.

Figure 15:
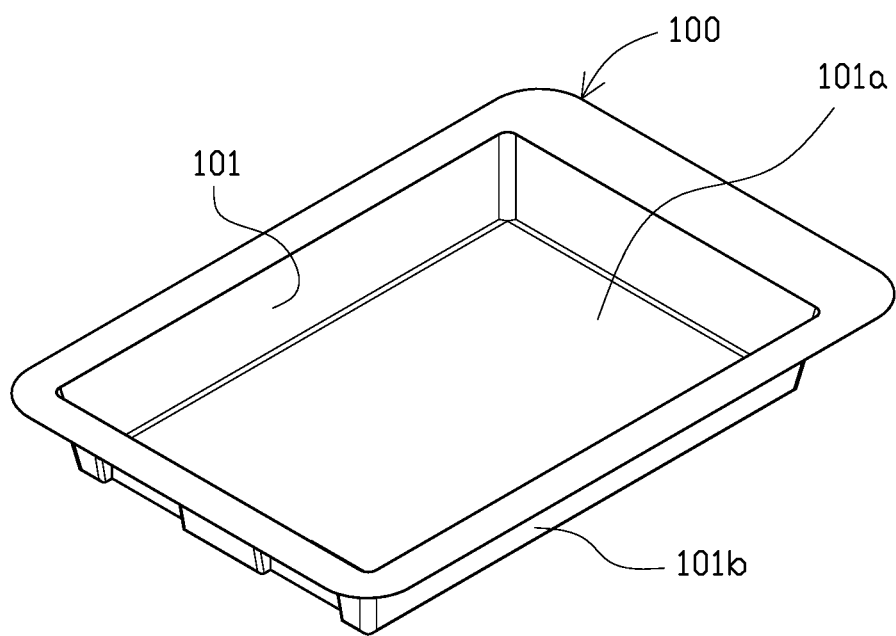
FIG. 15 is a perspective view illustrating a blister pack according to another embodiment.

For example, the object to be inspected or the inspection object may be a blister pack 100 shown in FIG. 15. The blister pack 100 has a pocket portion 101. The pocket portion 101 includes a bottom portion 101a in a rectangular shape in plan view and a side wall portion 101b in a rectangular frame shape connecting with the circumference of the bottom portion 101a.

(c) The materials, the layered structures and the like of the container film and the cover film are not limited to those of the embodiment described above. For example, in the embodiment described above, the container film 3 is made of a colorless transparent thermoplastic resin material, for example, PP or PVC, and has translucency.

This configuration is, however, not essential. In a modified configuration, the container film 3 may be made of, for example, a colorless translucent resin material, a colored transparent or colored translucent resin material, or even an opaque material (for example, an opaque resin material or a metal material). One example of the metal material is a material mainly made of aluminum, such as an aluminum laminated film.

With regard to inspection of the container film 3 made of the opaque material, reflected light inspection using reflected light as described later may be performed in place of or in addition to the transmitted light inspection using the transmitted light described in the above embodiment.

(d) In the configuration of the embodiment described above, the inspection device 21 is placed in the PTP packaging machine (blister packaging machine) 11 that performs up to filling of the contents such as the tablets 5. This configuration is, however, not essential. In a modified configuration, for example, in a production line that separately performs manufacture of the container film 3 and packaging of the contents, the inspection device 21 may be provided in a manufacturing apparatus of the container film 3. In another modified configuration, an offline inspection device configured to perform an inspection of the container film 3 with the pocket portions 2 formed therein may be provided separately from a manufacturing apparatus of the container film 3. In this modified configuration, the inspection device 21 may be provided with a conveyance unit configured to convey the container film 3.

(e) The placement location of the inspection device 21 in the PTP packaging machine 11 is not limited to the placement location of the embodiment described above. In the above embodiment, the inspection device 21 is placed at the location where the container film 3 is conveyed horizontally. This is, however, not essential. For example, the inspection device 21 may be placed at a location where the container film 3 is conveyed vertically or at a location where the container film 3 is conveyed obliquely.

(f) The layout configuration of the irradiation unit and the imaging unit is not limited to the layout configuration of the embodiment described above but may be another different configuration.

(f-1) For example, in the configuration of the above embodiment, the illumination device 50 is placed on the lower side of the container film 3 (the protrusion side of the pocket portions 2), while the camera 51 is placed on the upper side of the container film 3 (the opening side of the pocket portions 2).

This configuration is, however, not essential. One modified configuration may turn the positional relationship between the illumination device 50 and the camera 51 upside down. This modified configuration may radiate light from the upper side of the container film 3 (the opening side of the pocket portions 2) and take an image of the transmitted light from the lower side of the container film 3 (the protrusion side of the pocket portions 2).

This modified configuration may set the first focusing range GW1 of the camera 51 according to the height position of the bottom portions 2a of the pocket portions 2 located on the lower side and set the second focusing range GW2 of the camera 51 according to the height position of the flange portion 3b of the container film 3 located on the upper side. In other words, this modified configuration may specify the bottom portions 2a of the pocket portions 2 as the first inspection area and specify the flange portion 3b of the container film 3 as the second inspection area.

(f-2) In the layout configuration of the embodiment that the illumination device 50 is located on the lower side of the container film 3 (the protrusion side of the pocket portions 2) and that the camera 51 is located on the upper side of the container film 3 (the opening side of the pocket portions 2), another modified configuration may increase the value of the angle of inclination θ2 to be larger than the value of the embodiment (θ2>θ1) and perform the second imaging process at a timing when the flange portion 3b of the container film 3 is located within the second focusing range GW2 that is located at a position above the first focusing range GW1, while setting the first focusing range GW1 according to the height position of the bottom portions 2a of the pocket portions 2.

However, the configuration of the embodiments described above may be adopted because it is appropriate to perform imaging at a timing when the object-side section of the optical path L2 that is brought into focus via the mirror 51d passes through an optical path parallel to the normal direction of the flange portion 3b of the container film 3 (Z-axis direction) or the normal direction of the bottom portions 2a of the pocket portions 2 (Z-axis direction). Accordingly, the timing when the second imaging process is performed may be a timing when the bottom portion 2a of the pocket portion 2 or the flange portion 3b of the container film 3 is located at an identical position with the position of the mirror 51d in the film conveyance direction.

(f-3) Another modified configuration may invert the surface side and the rear side of the horizontally conveyed container film 3. This modified configuration may irradiate the opening side of the pocket portions 2 with light emitted from the illumination device 50 placed on the lower side of the container film 3 and take an image of the light transmitted to the protrusion side of the pocket portions 2 by using the camera 51 placed on the upper side of the container film 3.

This modified configuration may set the first focusing range GW1 according to the height position of the bottom portions 2a of the pocket portions 2 located on the upper side and set the second focusing range GW2 according to the height position of the flange portion 3b of the container film 3 located on the lower side.

Another modified configuration may increase the value of the angle of inclination θ2 to be larger than the value of the embodiment (θ2>θ1) and perform the second imaging process at a timing when the bottom portions 2a of the pocket portions 2 are located within the second focusing range GW2 that is located at a position above the first focusing range GW1, while setting the first focusing range GW1 according to the height position of the flange portion 3b of the container film 3.

(f-4) For example, in the case of inspection of the container film 3 made of an opaque material, one modified configuration may place both the irradiation unit and the imaging unit on one of the protrusion side and the opening side of the pocket portions 2 and take an image of the reflected light that is the light emitted from the irradiation unit and reflected by the container film 3.

In the case of performing the reflected light inspection by utilizing the reflected light, using the camera 51 of the above embodiment enables focused image data to be obtained with regard to each of a plurality of inspection areas having different heights in the container film 3.

(g) The inspection area of the object to be inspected or the inspection object is not limited to that of the embodiment described above. For example, the configuration of the embodiment performs the good/poor quality judgment of the container film 3 with specifying the flange portion 3b of the container film 3 as the first inspection area and specifying the bottom portions 2a of the pocket portions 2 as the second inspection area.

This configuration is, however, not essential. One modified configuration may perform the good/poor quality judgment of the container film 3 with specifying the bottom portions 2a of the pocket portions 2 as the first inspection area and specifying the side wall portions 2b of the pocket portions 2 as the second inspection area.

This modified configuration may increase the value of the angle of inclination θ2 to be larger than the value of the embodiment (θ2>θ1) and perform the second imaging process at a timing when the side wall portions 2b of the pocket portions 2 as the second inspection area are located within the second focusing range GW2 that is located at a position above the first focusing range GW1, while setting the first focusing range GW1 according to the height position of the bottom portions 2a of the pocket portions 2 as the first inspection area.

It is, however, appropriate to preform the second imaging process at a timing when the object-side section of the optical path L2 that is brought into focus via the mirror 51d passes through an optical path parallel to a normal direction of an inner face of the side wall portions 2b of the pocket portions 2.

(h) The configuration of the imaging unit is not limited to that of the embodiment described above. For example, according to the above embodiment, the single lens 51b is employed as the predetermined optical system configured to correct the field curvature. The predetermined optical system is, however, not limited to this example but may be a lens unit comprised of a plurality of optical members or the like.

The configuration of the mirror is also not limited to that of the embodiment described above. For example, the mirror 51d according to the embodiment is placed at a position intersecting with an optical path passing through an end of the angle of view of the lens 51b. This arrangement is, however, not essential. The mirror 51d is required to be placed at a position that intersects with an optical path passing through at least in the range of the angle of view of the lens 51b and at a position that does not intersect with the optical axis CL of the lens 51b. Accordingly, the angle of view 2θ of the lens 51b may be set to be larger than 2×θ1 (2θ>2×θ1).

(i) A mirror adjustment mechanism may be provided as the mirror adjustment unit (or the mirror adjustment device) configured to adjust the direction and/or the position (for example, the height position) of the mirror 51d, although not being specifically described in the above embodiment.

For example, one modified configuration may include actuators provided to individually move up and down the respective four corners of the mirror 51d formed in the rectangular flat plate-like shape. Another modified configuration may include a mechanism configured to perform tilt adjustment by rotating the mirror 51d about a predetermined rotating shaft and a mechanism configured to perform height adjustment by moving up and down the mechanism of tilt adjustment. A further modification may include only a mechanism configured to move the mirror 51d in the vertical direction or in the horizontal direction or may include only a mechanism configured to perform tilt adjustment.

(j) The camera 51 may be provided with a second mirror, in addition to the mirror 51d. For example, one modified configuration may place the mirror 51d on a downstream side in the film conveyance direction of the position of the optical axis CL of the camera 51 and place the second mirror on an upstream side in the film conveyance direction.

This modified configuration may set the first focusing range GW1 according to the height position of the flange portion 3b of the container film 3, set the second focusing range GW2 according to the height position of the bottom portions 2a of the pocket portions 2, and a third focusing range according to the height position of the side wall portions 2b of the pocket portions 2 as a third inspection area. Furthermore, this modified configuration may perform a third imaging process to take an image of the container film 3 at a third timing when the side wall portions 2b of the pocket portions 2 are located within the third focusing range of the camera 51 that is focusable via the second mirror.

(k) The configuration of the irradiation unit is not limited to that of the embodiment described above. For example, according to the embodiment, the illumination device 50 is configured to radiate ultraviolet light. One modified configuration may appropriately change the wavelength of light emitted from the illumination device 50 according to the material, the color and the like of the container film 3. This modified configuration may omit the bandpass filter 51a and cause the light that is emitted from the illumination device 50 and that is transmitted through the container film 3 to directly enter the lens 51*b*.

For example, in the case of the container film 3 made of an opaque material, such as aluminum, the light emitted from the illumination device 50 may be infrared light. In another example, in the case of the container film 3 made of a colored translucent material, the light emitted from the illumination device 50 may be visible light such as white light.

(l) The above embodiment is configured to perform the flange portion inspection based on the first inspection image (the flange portion inspection image) obtained by the first imaging process and to perform the pocket portion inspection based on the second inspection image (the pocket portion inspection image) obtained by the second imaging process.

This configuration is, however, not essential. One modified configuration may generate image data with regard to a predetermined inspection range, based on the first inspection image obtained by the first imaging process and the second inspection image obtained by the second imaging process and perform the flange portion inspection and the pocket portion inspection, based on the generated image data.

(m) According to the embodiment described above, the range including five pocket portions 2 in the film width direction of the container film 3 and one pocket portion 2 in the film conveyance direction, i.e., the range including one pocket portion array, is set as the imaging range and the inspection range with regard to one cycle of the inspection routine.

This configuration is, however, not essential. A range including multiple (for example, four) pocket portion arrays may be set as the imaging range and the inspection range with regard to one cycle of the inspection routine. In another example, a range corresponding to one PTP sheet 1 (a range including ten pocket portions 2) may be set as the imaging range and the inspection range with regard to one cycle of the inspection routine.

(n) The configuration of the irradiation unit is not limited to that of the embodiment described above. For example, the configuration of the above embodiment uses the ultraviolet light having the wavelength of 253±20 nm, which provides the transmittance of the container film 3 of about 30±10 percent, for the inspection. A modified configuration may perform an inspection by using light having a different wavelength. An example of such light may be visible light. In a configuration of performing an inspection by taking an image of reflected light, the light used may be infrared light or the like.

(o) The method of inspection is not limited to that of the embodiment described above. For example, the above embodiment is configured to binarize an inspection image and specify a defective area in the process of performing the good/poor quality judgment of the container film 3.

This configuration is, however, not essential. For example, one modified configuration may compare an inspection image with regard to the bottom portion 2*a* of the pocket portion 2 with an inspection image with regard to the bottom portion 2*a* of the pocket portion 2 of a non-defective product obtained in advance by a technique such as pattern matching and perform the good/poor quality judgment based on the matching degree.

Another modified configuration may use an AI model constructed by learning a neural network to perform the good/poor quality judgment of the container film 3. For example, this configuration may compare an inspection image obtained by imaging of the container film 3 (the pocket portions 2 and the flange portion 3*b*) with a reconstructed inspection image obtained by reconstruction of this inspection image by using an AI model to perform the good/poor quality judgment.

Although the disclosure has been described with respect to only a limited number of embodiments, those skilled in the art, having benefit of this disclosure, will appreciate that various other embodiments may be devised without departing from the scope of the present invention. Accordingly the scope of the invention should be limited only by the attached claims.

REFERENCE SIGNS LIST

1 . . . PTP sheet, 2 . . . pocket portion, 2*a* . . . bottom portion, 3 . . . container film, 3*b* . . . flange portion, 4 . . . cover film, 5 . . . tablet, 11 . . . PTP packaging machine, 15 . . . heating device, 16 . . . pocket portion forming device, 21 . . . inspection device, 50 . . . illumination device, 51 . . . camera, 51*a* . . . imaging element, 51*b* . . . lens, 51*d* . . . mirror, 52 . . . inspection controller

What is claimed is:

1. An inspection device, comprising:
an illumination device that irradiates a conveyed inspection object with predetermined light;
an imaging device that comprises:
    an optical system that corrects a field curvature in the optical system;
    an imaging element that takes an image of the inspection object via the optical system to obtain image data; and
    a mirror that reflects an incident light from the inspection object, toward the optical system; and
an inspection controller that:
    judges whether a quality of the inspection object is good or poor based on the image data; and
    controls the imaging device by executing:
        a first imaging process of causing the imaging device to take an image of a first inspection area of the inspection object at a first timing when the first inspection area is located within a first focusing range of the imaging device, wherein the first inspection area is focusable within the first focusing range without the mirror; and
        a second imaging process of causing the imaging device to take an image of a second inspection area of the inspection object at a second timing when the second inspection area is located within a second focusing range of the imaging device, wherein the second inspection area is out of the first focusing range in the first imaging process and is focusable within the second focusing range via the mirror.

2. The inspection device according to claim 1, wherein the second timing is a timing when the second inspection area is located at an identical position with a position of the mirror in a conveyance direction of the inspection object.

3. The inspection device according to claim 1, wherein the mirror reflects, at the second timing, an incident light toward the optical system, wherein the incident light passes through an optical path parallel to a normal direction of the second inspection area and enters the mirror from the second inspection area.

4. The inspection device according to claim 2, wherein the mirror reflects, at the second timing, an incident light toward the optical system, wherein the incident light passes through an optical path parallel to a normal direction of the second inspection area and enters the mirror from the second inspection area.

5. The inspection device according to claim 1, further comprising
a mirror adjustment device that adjusts at least one of a direction and a position of the mirror.

6. The inspection device according to claim 2, further comprising
a mirror adjustment device that adjusts at least one of a direction and a position of the mirror.

7. The inspection device according to claim 3, further comprising
a mirror adjustment device that adjusts at least one of a direction and a position of the mirror.

8. The inspection device according to claim 4, further comprising
a mirror adjustment device that adjusts at least one of a direction and a position of the mirror.

9. The inspection device according to claim 1, wherein the imaging device comprises:
a second mirror that reflects an incident light entering from the inspection object, toward the optical system, and
the inspection controller further executes:
a third imaging process of causing the imaging device to take an image of a third inspection area of the inspection object at a third timing when the third inspection area is located within a third focusing range of the imaging device, wherein the third inspection area is focusable within the third focusing range via the second mirror.

10. The inspection device according to claim 2, wherein the imaging device comprises:
a second mirror that reflects an incident light entering from the inspection object, toward the optical system, and
the inspection controller further executes:
a third imaging process of causing the imaging device to take an image of a third inspection area of the inspection object at a third timing when the third inspection area is located within a third focusing range of the imaging device, wherein the third inspection area is focusable within the third focusing range via the second mirror.

11. The inspection device according to claim 3, wherein the imaging device comprises:
a second mirror that reflects an incident light entering from the inspection object, toward the optical system, and
the inspection controller further executes:
a third imaging process of causing the imaging device to take an image of a third inspection area of the inspection object at a third timing when the third inspection area is located within a third focusing range of the imaging device, wherein the third inspection area is focusable within the third focusing range via the second mirror.

12. The inspection device according to claim 4, wherein the imaging device comprises:
a second mirror that reflects an incident light entering from the inspection object, toward the optical system, and
the inspection controller further executes:
a third imaging process of causing the imaging device to take an image of a third inspection area of the inspection object at a third timing when the third inspection area is located within a third focusing range of the imaging device, wherein the third inspection area is focusable within the third focusing range via the second mirror.

13. The inspection device according to claim 5, wherein the imaging device comprises:
a second mirror that reflects an incident light entering from the inspection object, toward the optical system, and
the inspection controller further executes:
a third imaging process of causing the imaging device to take an image of a third inspection area of the inspection object at a third timing when the third inspection area is located within a third focusing range of the imaging device, wherein the third inspection area is focusable within the third focusing range via the second mirror.

14. The inspection device according to claim 6, wherein the imaging device comprises:
a second mirror that reflects an incident light entering from the inspection object, toward the optical system, and
the inspection controller further executes:
a third imaging process of causing the imaging device to take an image of a third inspection area of the inspection object at a third timing when the third inspection area is located within a third focusing range of the imaging device, wherein the third inspection area is focusable within the third focusing range via the second mirror.

15. The inspection device according to claim 7, wherein the imaging device comprises:
a second mirror that reflects an incident light entering from the inspection object, toward the optical system, and
the inspection controller further executes:
a third imaging process of causing the imaging device to take an image of a third inspection area of the inspection object at a third timing when the third inspection area is located within a third focusing range of the imaging device, wherein the third inspection area is focusable within the third focusing range via the second mirror.

16. The inspection device according to claim 8, wherein the imaging device comprises:
a second mirror that reflects an incident light entering from the inspection object, toward the optical system, and
the inspection controller further executes:
a third imaging process of causing the imaging device to take an image of a third inspection area of the inspection object at a third timing when the third inspection area is located within a third focusing range of the imaging device, wherein the third inspection area is focusable within the third focusing range via the second mirror.

17. A blister packaging machine, comprising:
the inspection device according to claim 1.

18. A method for manufacturing a blister pack, the method comprising:
forming a pocket portion in a conveyed belt-shaped container film;
filling a predetermined content into the pocket portion;

mounting a belt-shaped cover film to the container film with the pocket portion filled with the content to close the pocket portion and obtaining a belt-shaped body;
separating the blister pack from the belt-shaped body; and
inspecting, as an inspection object, the container film with the pocket portion filled with the content, wherein
the inspecting comprises:
irradiating the container film with the pocket portion filled with the content with predetermined light;
judging whether a quality of the container film is good or poor based on image data obtained by an imaging device that takes an image of the container film irradiated with the light, wherein
the imaging device comprises an optical system that correct a field curvature in the optical system, and a mirror that reflects an incident light entering from the container film, toward the optical system; and controlling the imaging device by executing:
a first imaging process of causing the imaging device to take an image of a first inspection area of the container film at a first timing when the first inspection area is located within a first focusing range of the imaging device, wherein the first inspection area is focusable within the first focusing range without the mirror; and
a second imaging process of causing the imaging device to take an image of a second inspection area of the container film at a second timing when the second inspection area is located within a second focusing range of the imaging device, wherein the second inspection area is out of the first focusing range in the first imaging process and is focusable within the second inspection area via the mirror.

* * * * *